United States Patent
Mochizuki et al.

(10) Patent No.: US 7,446,757 B2
(45) Date of Patent: Nov. 4, 2008

(54) FOLDABLE DISPLAY, INPUT DEVICE PROVIDED WITH THE DISPLAY AND FOLDABLE KEYBOARD, AND PERSONAL COMPUTER PROVIDED WITH THE INPUT DEVICE

(75) Inventors: Isao Mochizuki, Kaizu-gun (JP); Takeyuki Takagi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 661 days.

(21) Appl. No.: 10/657,152

(22) Filed: Sep. 9, 2003

(65) Prior Publication Data

US 2004/0052044 A1 Mar. 18, 2004

(30) Foreign Application Priority Data

| Sep. 17, 2002 | (JP) | ............................ 2002-270647 |
| Sep. 17, 2002 | (JP) | ............................ 2002-270648 |
| Sep. 17, 2002 | (JP) | ............................ 2002-270649 |
| Sep. 17, 2002 | (JP) | ............................ 2002-270650 |
| Sep. 30, 2002 | (JP) | ............................ 2002-285270 |

(51) Int. Cl.
*G09G 5/00* (2006.01)

(52) U.S. Cl. ..................... 345/168; 345/905; 361/680; 361/681; 349/58

(58) Field of Classification Search ................. 345/168, 345/1.1, 156, 169, 905; 361/680, 600, 607, 361/610, 681; 348/794, 836; 349/58
See application file for complete search history.

(56) References Cited

U.S. PATENT DOCUMENTS

| 4,341,980 | A | * | 7/1982 | Noguchi et al. | .......... 315/169.1 |
| 5,198,991 | A | * | 3/1993 | Pollitt | ....................... 361/680 |
| 5,457,453 | A | * | 10/1995 | Chiu et al. | ..................... 341/22 |
| 5,594,619 | A | * | 1/1997 | Miyagawa et al. | .......... 361/681 |
| 6,016,176 | A | * | 1/2000 | Kim et al. | ...................... 349/84 |
| 6,081,207 | A | * | 6/2000 | Batio | .......................... 341/20 |
| 6,088,220 | A | * | 7/2000 | Katz | .......................... 361/680 |
| 6,256,017 | B1 | * | 7/2001 | Bullister | ..................... 345/168 |
| 6,266,234 | B1 | * | 7/2001 | Leman | ....................... 361/680 |
| 6,377,324 | B1 | * | 4/2002 | Katsura | ....................... 349/58 |
| 6,532,147 | B1 | * | 3/2003 | Christ, Jr. | ................... 361/683 |
| 6,825,832 | B2 | * | 11/2004 | Chung et al. | ................. 345/168 |
| 6,859,219 | B1 | * | 2/2005 | Sall | ............................. 345/1.1 |
| 2001/0054986 | A1 | * | 12/2001 | Leman | ....................... 345/1.1 |
| 2002/0050980 | A1 | * | 5/2002 | Furuki et al. | ................. 345/168 |
| 2003/0043087 | A1 | * | 3/2003 | Kim | ............................ 345/1.1 |
| 2004/0125549 | A1 | * | 7/2004 | Iredale | ....................... 361/681 |

FOREIGN PATENT DOCUMENTS

| JP | U 60-062159 | 5/1985 |
| JP | A 04-044154 | 2/1992 |
| JP | 09-134132 | * 5/1997 |

(Continued)

*Primary Examiner*—Sumati Lefkowitz
*Assistant Examiner*—Seokyun Moon
(74) *Attorney, Agent, or Firm*—Oliff & Berridge, PLC

(57) ABSTRACT

A joint (129) includes semicircular plates (131) each integrally formed with a link part (132) having a screw hole (133). The joint (129) couples cover members (107, 117) of a flexible display (102) by means of screws (134) passing through the screw holes (133) and grooves (125, 128) of the cover members (107, 117). The link parts (132) of the semicircular plates (131) are caused to operate in sync with each other to stably perform an opening and closing operation of the cover members (107, 117).

29 Claims, 24 Drawing Sheets

FOREIGN PATENT DOCUMENTS

| | | |
|---|---|---|
| JP | A 10-207389 | 8/1998 |
| JP | A 10-293624 | 11/1998 |
| WO | WO99/34348 | 7/1999 |

* cited by examiner

FOLDABLE DISPLAY, INPUT DEVICE PROVIDED WITH THE DISPLAY AND FOLDABLE KEYBOARD, AND PERSONAL COMPUTER PROVIDED WITH THE INPUT DEVICE

BACKGROUND OF THE INVENTION

1. Field of the Invention

The present invention relates to a foldable display with superior portability, an input device provided with the foldable display and a foldable keyboard with superior portability and good operationality during operation, and a personal computer provided with the input device. More specifically, the present invention relates to an input device and a personal computer provided with a display constructed to be foldable in correspondence with a folded state of a keyboard, whereby enhancing portability of the input device and the personal computer for carrying, achieving good operationality equivalent to a desktop type input device and personal computer during use, and further enabling a stably folding operation of the display over a long period of time.

2. Description of Related Art

Heretofore, there have been proposed various types of portable electronic devices each including an input operating part, for example, a foldable keyboard, and a foldable display.

For example, Japanese patent unexamined publication No. Hei 10-293624 discloses a portable electronic device including a first unit mounting a display part and a second unit constructing an input operating part, wherein the first and second units are rotatably connected through a connecting part and the second unit includes a main part and two sub parts foldably connected with both sides of the main part through two connecting parts (See JP-A-10/293624, on page 2 and FIGS. 1 through 3).

In such portable electronic device, the main part and the sub parts are horizontally arranged during use, thereby providing a wide area as an inputting part and, on the other hand, the sub parts are folded on the main part through the connecting parts during nonuse, thereby enhancing the portability.

Furthermore, International patent publication No. WO99/34348 discloses a portable electronic device constructed such that a main unit of the device is coupled in an openable and closable relation with a cover through coupling means such as a hinge, and a flexible liquid crystal display panel integrally including a touch-sensitive input operating part is fixed over the main unit and the cover (See WO99/34348, on page 9 and FIGS. 1 through 3).

During use of this portable electronic device, a desired input operation is performed by means of the touch-sensitive input operating part provided in the display panel. During nonuse, when the cover is closed, a bent part of the display panel is caused to enter clearance grooves formed in the main unit and the cover near the coupling means, while ensuring a large curvature. Accordingly, it is possible to prevent damage and deterioration due to the folding operation of the flexible liquid crystal display panel.

In the portable electronic device disclosed in JP-A-10/293624, however, the two sub parts in the input operating part are constructed foldable to be superposed on the main part through the connecting parts, whereas the first unit including the display part is designed in itself not to be foldable. Thus, the size of the electronic device depends on the size of the first unit. This is still insufficient to further improve the portability of the electronic device and enhance the downsizing of the whole electronic device.

In the portable electronic device disclosed in WO99/34348, the touch-sensitive input operating part and the display part are constructed by a single flexible liquid crystal display panel, and this panel is fixedly laid over the main unit and the cover so that the panel is folded when the cover is closed during nonuse. The touch-sensitive input operating part itself is generally formed flat, which is very poor in operationality as compared with a keyboard on which a plurality of keys are arranged. In addition, the touch-sensitive input operating part itself is not foldable, so that the size of this input operating part is determined depending on the size of the flexible liquid crystal display panel. Similarly to the above case, it is still insufficient to further improve the portability of the portable electronic device and to downsize the whole device. The bent portion of the display panel is caused to enter the clearance grooves when the cover is closed, thereby preventing damage and deterioration due to the folding operation of the display panel. When bending (folding) operations of the display panel are repeated over a long time, the display panel would often become liable to automatically bend with a fold line, which causes corrugations in the panel. Consequently, it is still insufficient to stably bend or fold the flexible liquid crystal display panel.

SUMMARY OF THE INVENTION

The present invention has been made in view of the above circumstances and has an object to overcome the above problems and to provide a foldable display in correspondence with a folded state of a foldable keyboard, an input device including the display, and a personal computer, capable of extremely enhancing the portability of the input device and the personal computer for carrying and achieving good operationality during use equivalent to a desktop type input device and personal computer, and enabling a stable folding operation of the display over a long period of time.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an input device including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard, and a foldable flexible display rotatably attached to one edge of the first or second keyboard unit, the display being openable in correspondence with the horizontally arranged state of the first and second keyboard units and foldable in correspondence with the folded state of the first and second keyboard units.

In the above input device, the flexible display is opened in correspondence with a horizontally arranged state of the first and second keyboard units. For use of the keyboard, a display part of the flexible display is widened in displaying area, making the letters or other information displayed thereon easily viewable and being not subject to any restriction in displaying the letters or others. Furthermore, the first and second keyboard units are unfolded from the folded state into the horizontally arranged state, thereby providing an operation area equivalent to that of the keyboard of a desktop type computer, so that the key operationality can be enhanced. For carrying, or nonuse, of the keyboard, the flexible display is folded in correspondence with the folded state of the first and second keyboards. Accordingly, the whole input device can be improved in portability for carrying.

According to another aspect, the present invention provides a personal computer including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard, and a computer main unit provided to the first or second keyboard unit; and a foldable flexible display rotatably attached to one edge of the first or second keyboard unit, the display being openable in correspondence with the horizontally arranged state of the first and second keyboard units and foldable in correspondence with the folded state of the first and second keyboard units.

In the above personal computer, the flexible display is opened in correspondence with a horizontally arranged state of the first and second keyboard units. For use of the keyboard, a display part of the flexible display is widened in displaying area, making the letters or other information displayed thereon easily viewable and being not subject to any restriction in displaying the letters or others. Furthermore, the first and second keyboard units are unfolded from the folded state into the horizontally arranged state thereby providing an operation area equivalent to that of the keyboard of a desktop type computer, so that the key operationality can be enhanced. For carrying, or nonuse, of the keyboard, the flexible display is folded in correspondence with the folded state of the first and second keyboards. Accordingly, the whole input device can be improved in portability during the carrying.

Furthermore, according to another aspect, the present invention provides a personal computer including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard, and a computer main unit provided to the first or second keyboard unit; and a foldable flexible display including a cover unit having a length longer than the first or second keyboard unit and a flexible display sheet set in the cover unit, the cover unit including a support portion at a lower end for rotatably supporting the cover unit in a cantilever state at one edge of the computer main unit so that the display is openable in correspondence with the horizontally arranged state of the first and second keyboard units and foldable in correspondence with the folded state of the first and second keyboard units, wherein the cover unit further includes a projection member formed at another lower end opposite to the end formed with the support portion so that a bottom surface of the projection member is flush with a bottom surfaces of the opened keyboard and the computer main unit.

In the above personal computer, the flexible display is opened is opened in correspondence with a horizontally arranged state of the first and second keyboard units. For use of the keyboard, a display part of the flexible display is widened in displaying area, making the letters or other information displayed thereon easily viewable and being not subject to any restriction in displaying the letters or others. Furthermore, the first and second keyboard units are unfolded from the folded state into the horizontally arranged state thereby providing an operation area equivalent to that of the keyboard of a desktop type computer, so that the key operationality can be enhanced. For carrying, or nonuse, of the keyboard, the flexible display is folded in correspondence with the folded state of the first and second keyboards. Accordingly, the whole input device can be improved in portability during the carrying. In addition, the projection member is formed at the lower end opposite to the support part of the cover unit of the flexible display so that the bottom surface of the projection member is flush with the bottom surface of the computer main unit. Thus, the flexible display can stably be held in a horizontal position on an installation surface of the input device, without tilting downward.

According to another aspect, the present invention provides a display including: a first cover member; a second cover member provided side by side with the first cover member; a joint provided between the first and second cover members; a linkage system integrally formed with the joint at both ends thereof, the linkage system including a pair of link parts which couples the first and second cover members; and a flexible display sheet placed over the first cover member, the joint, and the second cover member, the second cover member being slidable and foldable through the linkage system with respect to the first cover member.

In the above display, the first and second cover members are integrally formed at both ends of the joint disposed between the cover members and mutually connected through the linkage system including the pair of link members. The second cover member is structured in slidable and foldable relation with the first cover member through the linkage system. Accordingly, as compared with the case where the link parts are provided separately from the joint, the first and second cover members can be synchronously slid, folded, and opened to each other. This makes it possible to stably perform the sliding, folding, and opening operations of the first and second cover members over a long period of time, thus preventing each cover member from being slid, folded, or opened in a tilting state.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
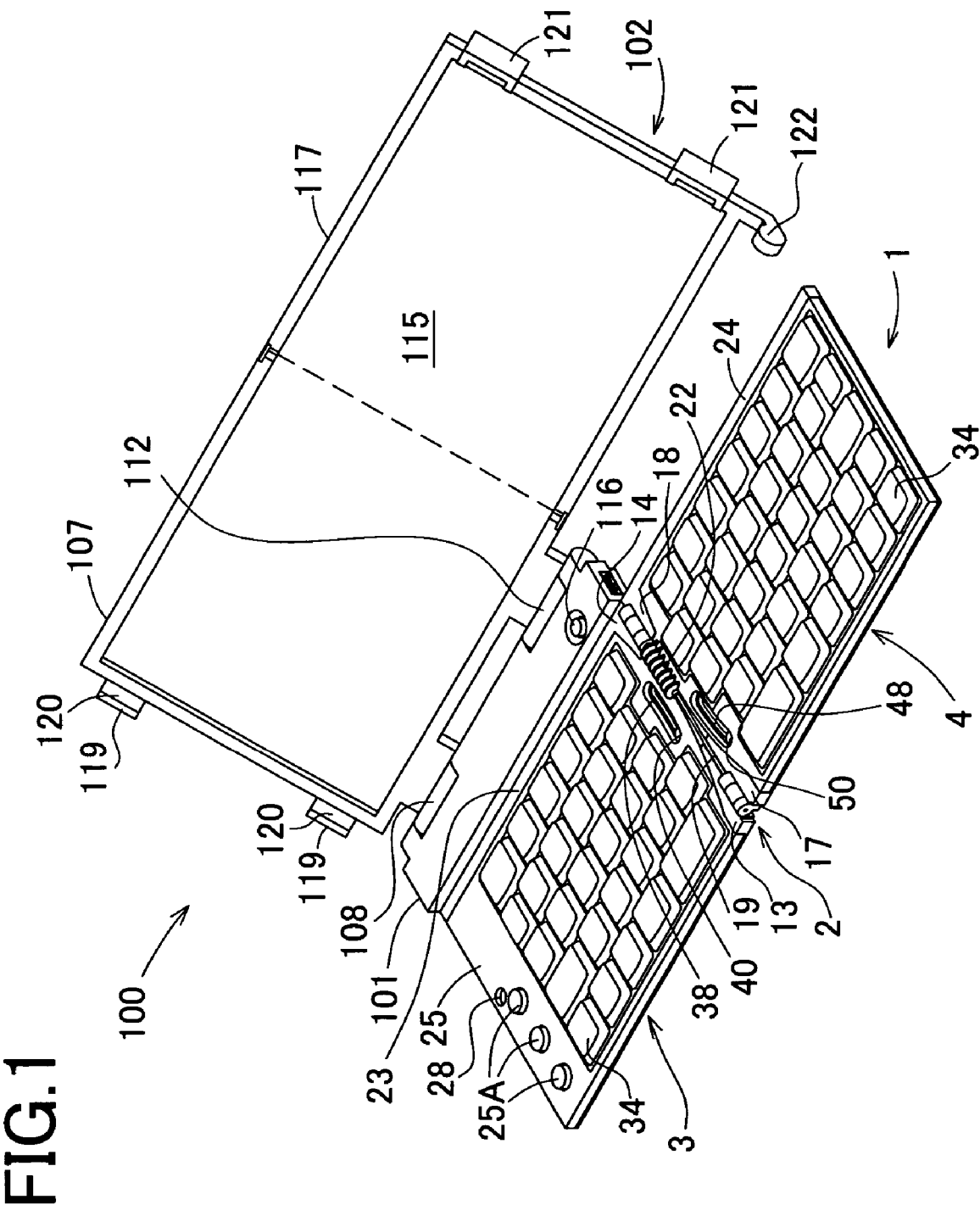
FIG. 1 is a perspective view of an input device in a first embodiment.
Figure 2:
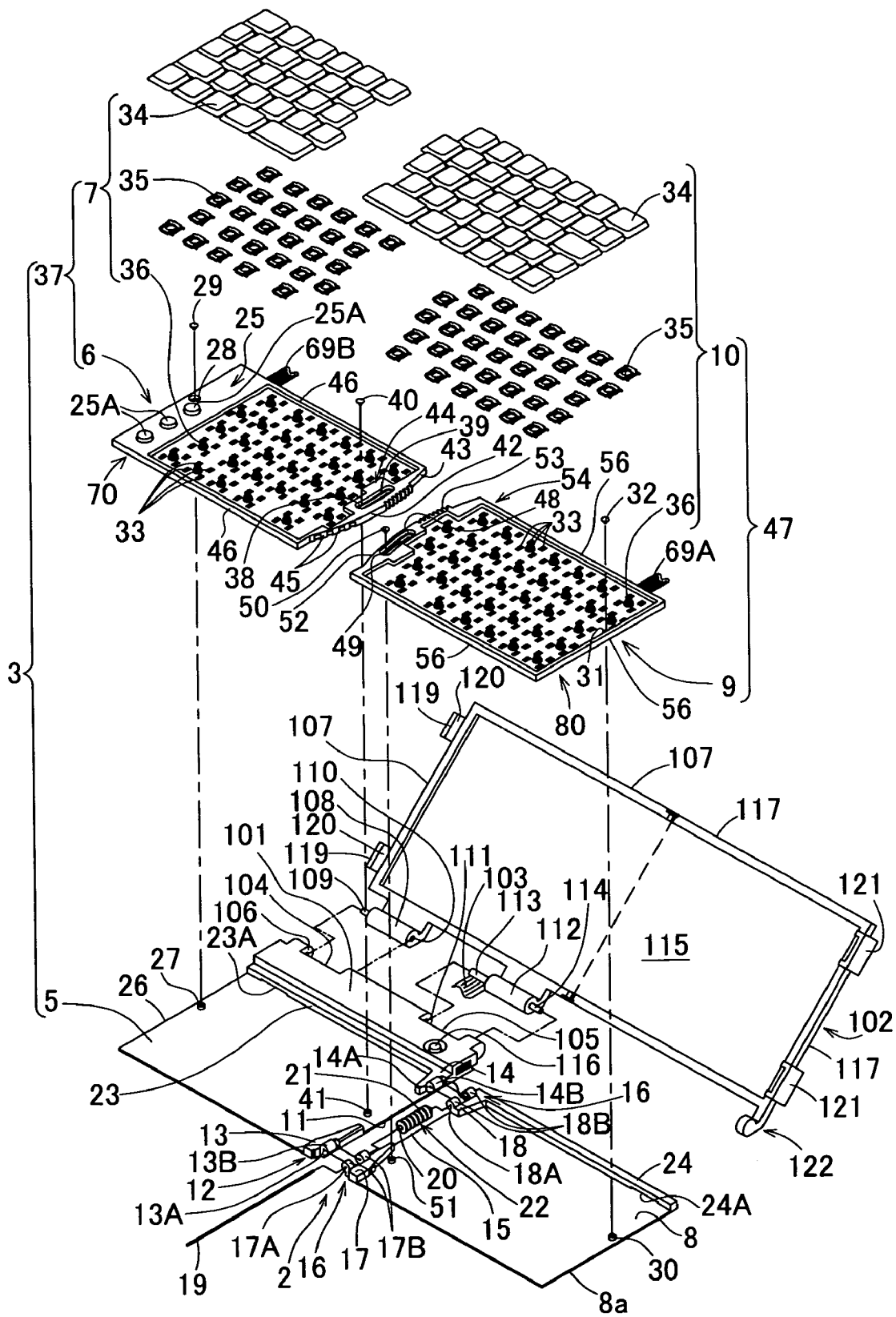
FIG. 2 is an exploded perspective schematic view of the input device.

A detailed description of preferred embodiments of an input device embodying the present invention will now be given referring to the accompanying drawings. At first, a schematic structure of the input device in a first embodiment is explained with reference to FIGS. 1 and 2. FIG. 1 is a perspective view of the input device in the first embodiment. FIG. 2 is an exploded perspective view of the same.

In FIG. 1, an input device 100 basically includes a keyboard 1, a control unit 101 united with the keyboard 1, and a flexible display 102 rotatably connected with one side of the control unit 101.

Figure 3:
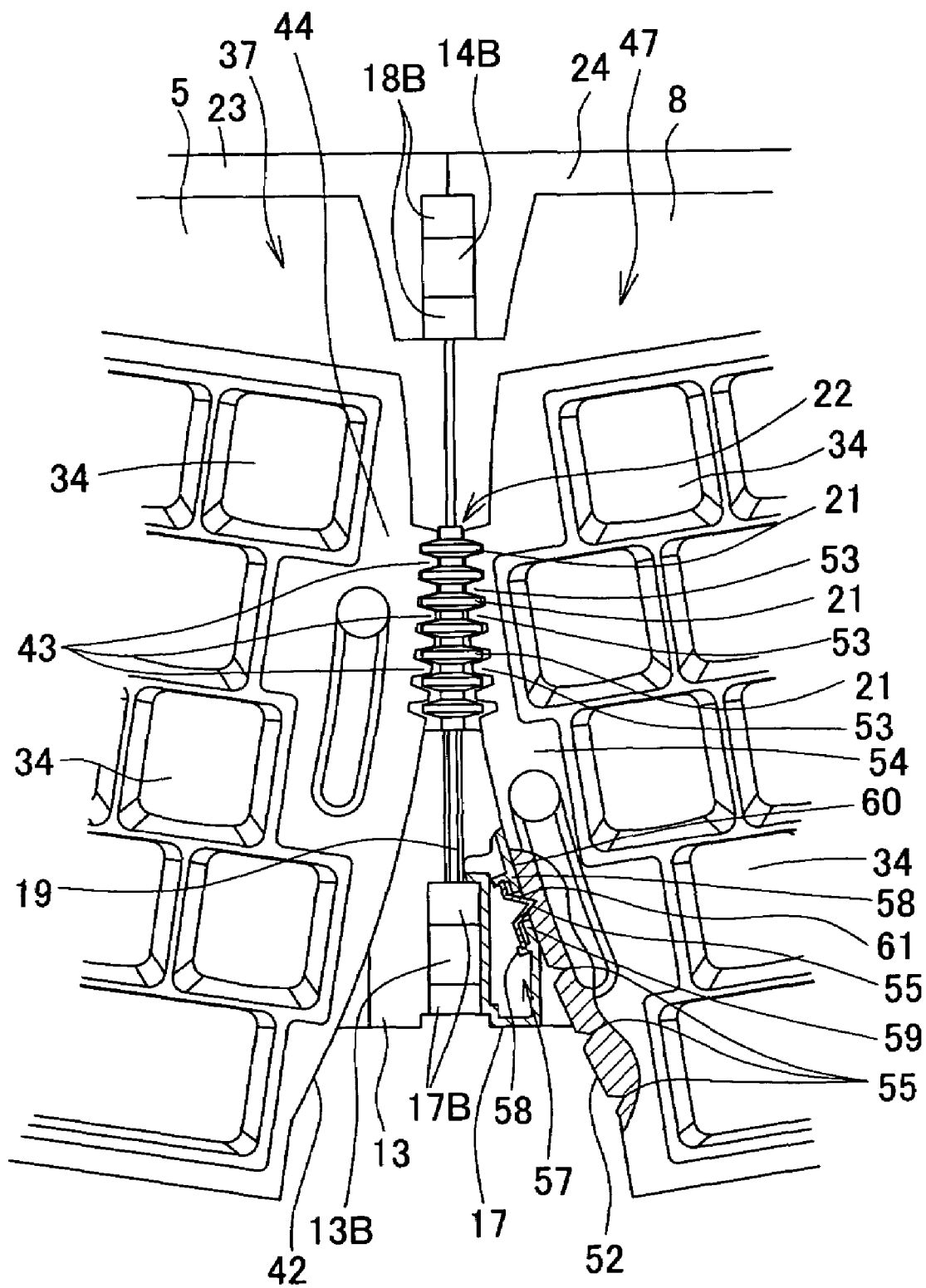
FIG. 3 is an enlarged explanatory view of a synchronizing system for synchronizing turning motions of a first and second support plates.

The keyboard 1 is first explained in detail with reference to FIGS. 1 through 3. FIG. 3 is an enlarged explanatory view of a synchronizing system for synchronizing turning motions of a first and second support plates. The keyboard 1 basically includes a first and second keyboard units 3 and 4 which are rotatably connected with each other through a rotatable connecting part 2. The first keyboard unit 3 is constructed of a first base plate 5, a first support plate 6 supported to be horizontally turnable on the first base plate 5, and a plurality of key switches 7 arranged on the first support plate 6. The second keyboard unit 4 is constructed of a second base plate 8, a second support plate 9 supported to be horizontally turnable on the second base plate 8, and a plurality of key switches 10 arranged on the second support plate 9.

The connecting part 2 is explained below. The first base plate 5 is made of a metallic thin plate such as aluminum (or which may made of a resinous thin plate). This plate 5 is provided, at two corners 12 (one of which is shown) of an edge (a right edge in FIG. 1) 11, with resinous bearing members 13 and 14 constituting a part of the connecting part 2. The bearing member 13 is provided with a bearing 13B formed with a bearing hole 13A. The bearing member 14 is similarly provided with a bearing 14B formed with a bearing hole 14A.

The second base plate 8 is made of a metallic thin plate such as aluminum (or which may be made of a resinous thin plate), as with the first base plate 5. This plate 8 is provided, at two corners 16 of an edge (a left edge in FIG. 1) 15, with resinous bearing members 17 and 18 constituting a part of the connecting part 2. The bearing member 17 is provided with two separate bearings 17B each having a bearing hole 17A. Similarly, the bearing member 18 is provided with two separate bearings 18B each having a bearing hole 18A. The bearing 13B is engaged in between the bearings 17B so that the bearing hole 13A of the bearing 13B is aligned with the bearing holes 17A of the bearings 17B. The bearing 14B is engaged in between the bearings 18B so that the bearing hole 14A is aligned with the bearing holes 18A of the bearings 18B. In these aligned bearing holes 13A, 17A, 14A, and 18A, a support shaft 19 is mounted. Thus, the first and second base plates 5 and 8 are rotatably supported through the support shaft 19. On this shaft 19, a slidable member 22 having a cylindrical shape with a center hole 20 and gear teeth 21 concentrically arranged on the periphery is slidably fit through the center hole 20. The slidable member 22 serves to turn the first and second keyboard units 3 and 4 in sync with each other, and the effect thereof will be mentioned later.

It is to be noted that the bearing member 14 is integrally formed with a hollow peripheral wall 23 and the bearing member 18 is integrally formed with a hollow peripheral wall 24. This peripheral wall 24 is formed with a hole 24A through which a sheet-shaped lug 69A is inserted in the wall 24. The lug 69A is provided with signal wires for connecting each key switch 10 arranged on the second keyboard unit 4 to the control unit 101 (mentioned later). Specifically, the lug 69A is a sheet sandwiched between and extended from an upper and lower sheets constituting a membrane switch of each key switch 10. This lug 69A forms a lead wire not shown which is guided through the inside of the peripheral wall 24 to the outside via the hollow bearing member 18 and the bearing 18B and then wound on the support shaft 19 and guided into the peripheral wall 23 through the hollow bearing member 14. The peripheral wall 23 is formed with a through hole 23A through which a sheet-shaped lug 69B is inserted in the wall 23. The lug 69B is constituted of signal wires for connecting each key switch 7 provided on the first keyboard unit 3 to the control unit 101. It is to be noted the lug 69B is a sheet sandwiched between and extended from an upper and lower sheets constituting a membrane switch of each key switch 7. This lug 69B forms a lead wire not shown which is connected to the control unit 101 together with the lead wire guided from the second keyboard unit 4 through the peripheral walls 24 and 23.

The first base plate 5 is formed with a screw seat 27 at almost the center of and near an edge 26 opposite to the edge 11. A screw 29 is threaded into this screw seat 27 after passing, with play, through a screw hole (not shown) formed in the first support plate 6 and a screw hole 28 formed in a frame member 70 mentioned later, specifically, in the switch section 25 integrally formed with the frame member 70, in correspondence with the former screw. Thus, the first support plate 6 is mounted on the first base plate 5 so as to be horizontally turnable (pivotable) about the screw 29 and the screw seat 27 as a turning fulcrum (pivot point). The second base plate 8 is formed with a screw seat 30 at almost the center of and slightly inside an edge 8a opposite to the edge 15. A screw 32 is threaded into this screw seat 30 after passing through a screw hole 31 of the second support plate 9 with play. Thus, the second support plate 9 is mounted on the second base plate 8 so as to be horizontally turnable (pivotable) about the screw seat 30 as a turning fulcrum (pivot point).

The first support plate 6 of the first keyboard unit 3 is made of a metallic thin plate such as aluminum, on which a predetermined number of key switches 7 which are operated with the left hand of a user are arranged. It is to be noted that the number of the key switches 7 for the left hand is determined based on International Standards (ISO 2126 and ISO 2530).

Furthermore, the first support plate 6 is integrally formed with four engagement parts 33 for one key switch 7 by press working or other techniques. On this first support plate 6, there is placed a membrane switch of a three-layer structure not shown (including an upper sheet having a movable electrode, a lower sheet having a fixed electrode, and a spacer sheet placed between the upper and lower sheets and having a switching hole whereby to separate the movable electrode and the fixed electrode). Each engagement part 33 is formed protruding upward through holes formed in the membrane switch.

Each key switch 7 is basically structured of a key top 34, a pair of link members 35 for vertically guiding the key top 34, and a rubber spring 36 which is disposed on the membrane switch at a position corresponding to a switching part defined by the movable electrode and the fixed electrode of the membrane switch and urges the key top 34 upward. Each upper end of the link members 35 is movably connected with the key top 34 at its lower surface and each lower end of the link members 35 is movably engaged in each engagement part 33. During non-depression, the key top 34 is urged upward by the urging force of the rubber spring 36 and held in a non-depression position. When the key top 34 is pressed down against the urging force of the rubber spring 36, the rubber spring 36 pushes the movable electrode of the membrane switch to bring the movable electrode into contact with the fixed electrode in the switching hole, thereby performing a switching operation. The above mentioned key switches 7 and first support plate 6 constitute a first key unit 37. The structure of each key switch 7 is well known in the art and the detailed explanation thereof is omitted herein.

The first support plate 6 is formed with a side edge (a right side in FIG. 2) which forms a circularly arcuate face coincident with a turning-radius of the plate 6 about the turning fulcrum (i.e., the screw 29 passing through the screw hole 28 with play and the screw seat 27). Inside the circularly arcuate face, an arcuate slot 39 is formed, which receives a screw 40 with play. This screw 40 is threaded into a screw seat 41 formed in the first base plate 5. The slot 39 and the screw 40 act to guide the first support plate 6 for horizontal stable turning thereof on the first base plate 5.

On the first support plate 6, a rectangular frame member 70 integrally made of resin is provided surrounding the peripheral portions of the plate 6. This frame member 70 is provided with a switch section 25 in which various switches 25A are arranged, peripheral walls 46, and a first gear member 44. This first gear member 44 has, on the circularly actuate face side of the first support plate 6. a circularly actuate face 42 having the same curvature of radius as that of the circularly actuate face of the first support plate 6. The circularly actuate face 42 is formed with gear teeth 43 engageable with the gear teeth 21 of the slidable member 22. Furthermore, the circularly actuate face 42 of the first gear member 44 is formed with a plurality of locking recesses 45 which constitute a part of a locking system 57 mentioned later. The first gear member 44 is also formed with a slot 38 corresponding to the slot 39 in the first support plate 6.

The second support plate 9 in the second keyboard unit 4 is made of a metallic thin plate such as aluminum, similar to the first support plate 6. On the second support plate 9, on which a predetermined number of key switches 10 which are operated with the right hand are arranged. It is to be noted that the number of the key switches 10 for the right hand is determined based on International Standards (ISO 2126 and ISO 2530), which is larger than the number of key switches 7 for the left hand on the first support plate 6. The key switch 10 is of identical construction to that of the key switch 7 mentioned above and therefore the constituent elements are explained with the same reference numbers.

The second support plate 9 is integrally formed with four engagement parts 33 for one key switch 10 by press working or other techniques. On this second support plate 9, there is placed a membrane switch of a three-layer structure not shown (including an upper sheet having a movable electrode, a lower sheet having a fixed electrode, and a spacer sheet placed between the upper and lower sheets and having a switching hole whereby to separate the movable electrode and the fixed electrode). Each engagement part 33 is formed protruding upward through holes formed in the membrane switch.

Each key switch 10 is basically structured of a key top 34, a pair of link members 35 for vertically guiding the key top 34, and a rubber spring 36 which is disposed on the membrane switch at a position corresponding to a switching part defined by the movable electrode and the fixed electrode of the membrane switch, and urges the key top 34 upward. Each upper end of the link members 35 is movably connected with the key top 34 at its lower surface and each lower end of the link members 35 is movably engaged in each engagement part 33. During non-depression, the key top 34 is urged upward by the urging force of the rubber spring 36 and held in a non-depression position. When the key top 34 is pressed down against the urging force of the rubber spring 36, the rubber spring 36 pushes the movable electrode of the membrane switch to bring the movable electrode into contact with the fixed electrode in the switching hole, thereby performing a switching operation. The above mentioned key switch 10 and second support plate 9 constitute a second key unit 47.

The second support plate 9 is formed with a side edge (a left side in FIG. 2) which forms a circularly actuate face coincident with a turning-radius of the plate 9 about the turning fulcrum (the screw 32 passing through the screw hole 31 with play and the screw seat 30). Inside the circularly actuate face, an actuate slot 49 is formed, which receives a screw 50 with play. This screw 50 is threaded into a screw seat 51 formed in the second base plate 8. The slot 49 and the screw 50 act to guide the second support plate 9 for horizontal stable turning thereof on the second base plate 8.

On the second support plate 9, a rectangular frame member 80 integrally made of resin is provided surrounding the peripheral portions of the plate 9. This frame member 80 is provided with peripheral walls 56 and a second gear member 54. This second gear member 54 has, on the circularly actuate face side of the second support plate 9, a circularly actuate face 52 having the same curvature of radius as that of the circularly actuate face of the second support plate 9. The circularly actuate face 52 is formed with gear teeth 53 engageable with the gear teeth 21 of the slidable member 22. Furthermore, the circularly actuate face 52 of the second gear member 54 is formed with a plurality of locking recesses 55 (see FIG. 3) which constitute a part of a locking system 57 mentioned later. The second gear member 54 is also formed with a slot 48 corresponding to the slot 49 in the second support plate 9.

Figure 4:
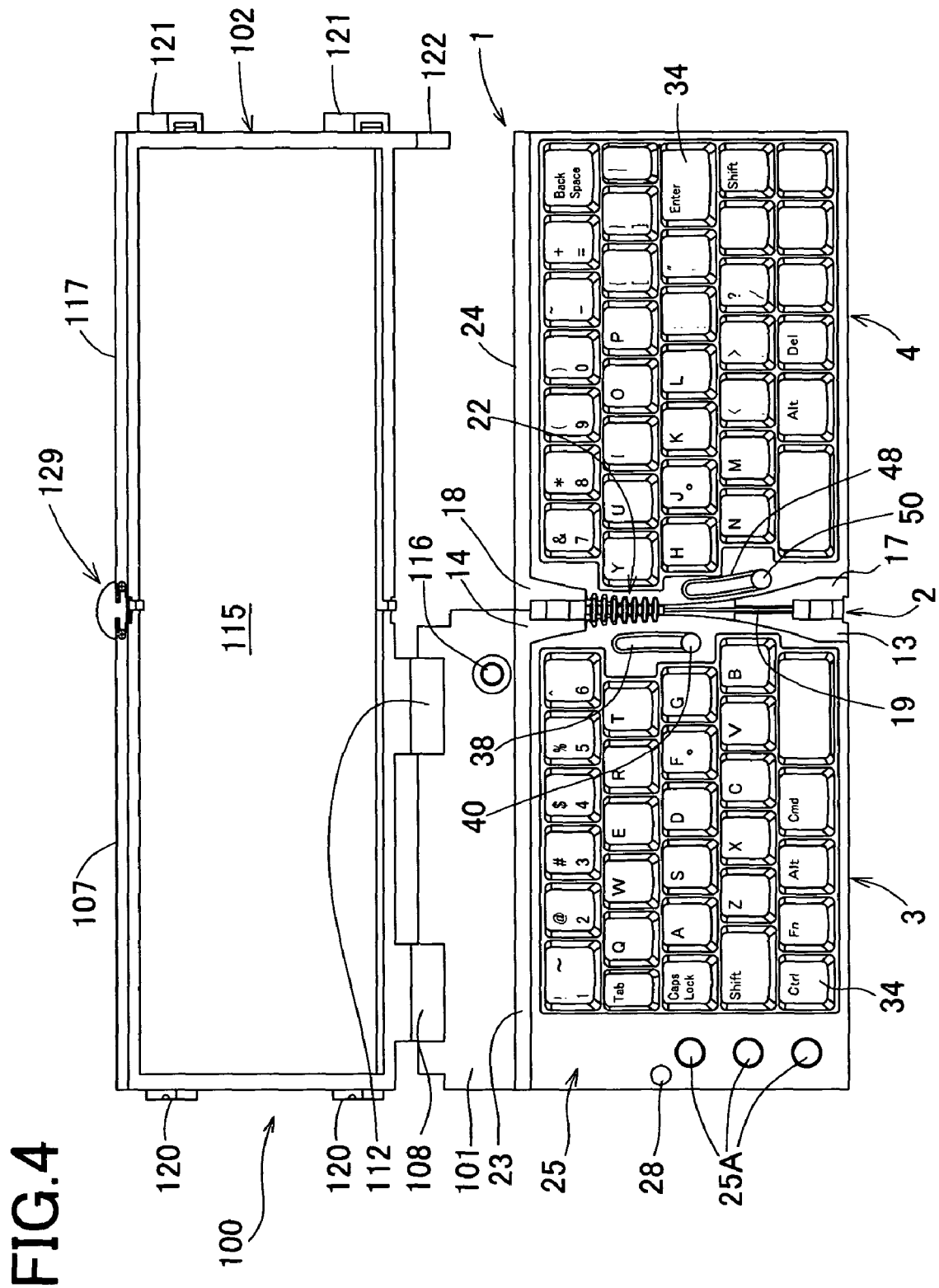
FIG. 4 is an explanatory view of the first and second support plates in respective unturned positions.
Figure 5:
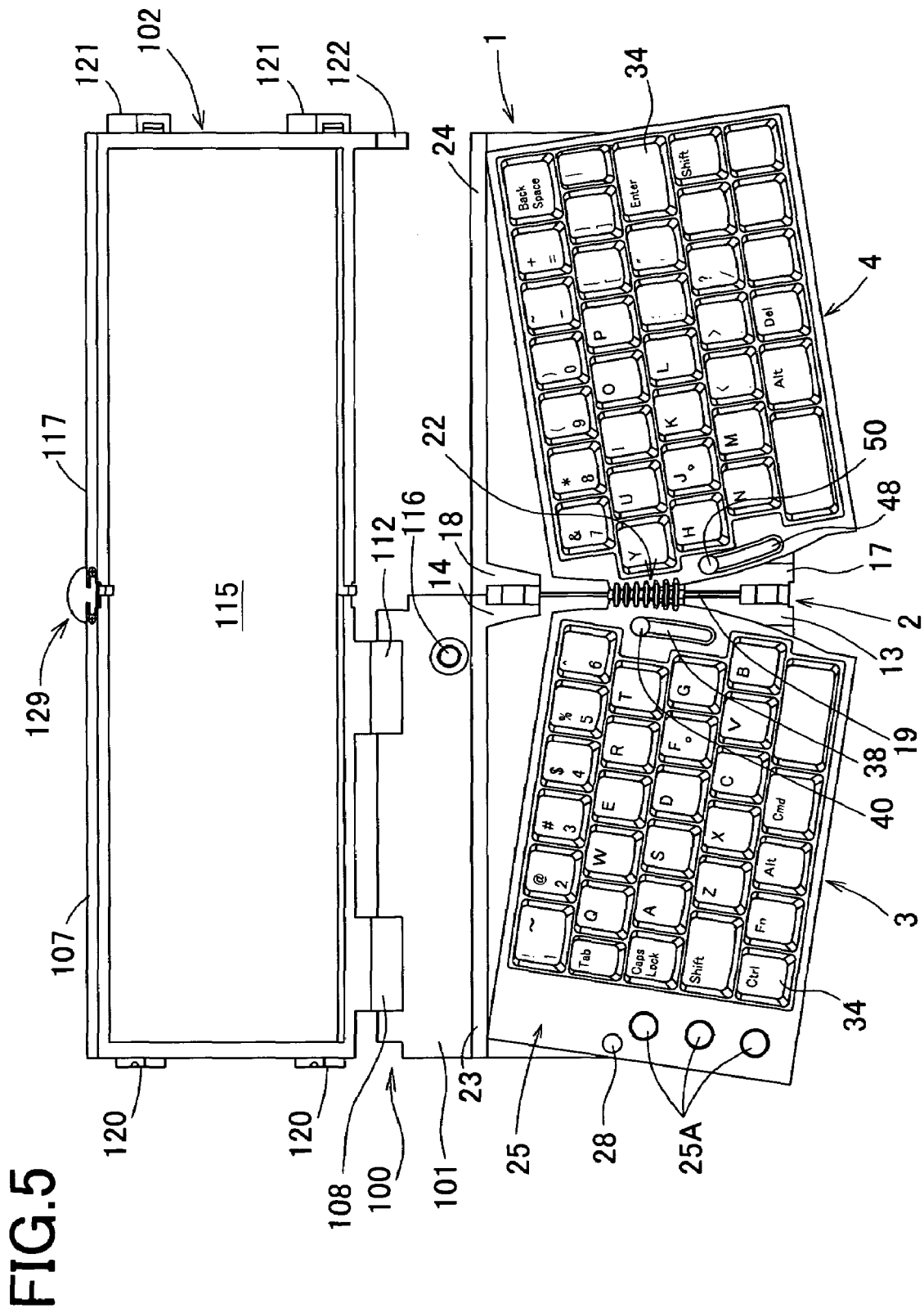
FIG. 5 is an explanatory view of the first and second support plates turned to respective maximum turning positions.

Next, explanation is made on the synchronizing system for horizontally turning the first and second support plates 6 and 9 at the same time on the first and second base plates 5 and 8 respectively and the locking system for locking the first and second support plates 6 and 9 at respective turned positions after turning by means of the synchronizing system, referring to FIGS. 3 through 5. FIG. 3 is an enlarged explanatory view of the synchronizing system for synchronizing turning motions of the first and second support plates 6 and 9. FIG. 4 is an explanatory view of the first and second support plates 6 and 9 in respective unturned positions. FIG. 5 is an explanatory view of the first and second support plates 6 and 9 turned to respective maximum turning positions.

In FIG. 3, the gear teeth 43 formed on the circularly actuate face 42 of the first gear member 44 and the gear teeth 53 formed on the circularly actuate face 52 of the second gear member 54 are engaged with the gear teeth 21 of the slidable member 22 slidably fit on the support shaft 19.

The gear teeth 21 of the slidable member 22 are concentrically formed as above, so that the distances (lengths) from the center of the slidable member 22 to the peripheral edges of the gear teeth 21 are equal to one another. The gear teeth 43 and the gear teeth 53 are formed on the circularly actuate faces 42 and 52 respectively, so that the peripheral edges of the gear teeth 43 and 53 are arranged in a circular arc relation. Accordingly, the gear teeth 21 nonuniformly engage with the gear teeth 43 and 53, specifically, shallow in a part and deep in another part. Such engagement relation does not change even when the slidable member 22 is slid on the support shaft 19 in association with the turning of the first and second support plates 6 and 9. However, the gear teeth 21 of the slidable member 22 always partly deep engage with the gear teeth 43 of the first gear member 44 and the gear teeth 53 of the second gear member 54 wherever the slidable member 22 is on the support shaft 19, thereby keeping the engagement between gear teeth 21 and each of the gear teeth 43 and 53.

In an unturned state of the first and second support plates 6 and 9 as shown in FIG. 4, the key switches 7 and 10 are arranged on the support plates 6 and 9 in the same key arrangement as that in a standard keyboard. In this state, the engagement between the gear teeth 21 of the slidable member 22 and the gear teeth 43 of the first gear member 44 and the gear teeth 53 of the second gear member 54 respectively is shallow in an upper portion in FIG. 4 and deep in a lower portion. Naturally, the keyboard 1 can be operated in the above key arrangement as needed.

It is to be noted that the distance from the engaging position between the gear teeth 43 of the first support plate 6 and the gear teeth 21 of the slidable member 22 to the screw 29 (the turning center) and the distance from the engaging position between the gear teeth 53 of the second support plate 9 and the gear teeth 21 of the slidable member 22 to the screw 32 (the turning center) are determined to be equal to each other. Thus, the slidable member 22 serves to smoothly turn the support plates 6 and 9.

When one of the first key unit 37 and the second key unit 47 in the position shown in FIG. 4 is turned clockwise or counterclockwise in FIG. 4, the slidable member 22 of which the gear teeth 21 engage with the gear teeth 43 and 53 of the first and second gear members 44 and 54 is caused to slide downward in FIG. 4 on the support shaft 19. This synchronously causes the first support plate 6 to turn clockwise about the screw 29 and the screw seat 27 as the turning fulcrum and the second support plate 9 to turn counterclockwise about the screw 32 and the screw seat 30 as the fulcrum. The keyboard 1 can also be operated in this key arrangement.

When the first support plate 6 or the second support plate 9 is further turned, the slidable member 22 is caused to slide further downward on the support shaft 19 in the same way as the above case. The first and second support plates 6 and 9 are synchronously turned clockwise and counterclockwise respectively up to the maximum turning positions as shown in FIG. 5. The keyboard 1 can also be operated in this key arrangement.

Accordingly, when a user turns either the first key unit 37 or the second key unit 47 prior to the operation of the keyboard 1, the other key unit is allowed to turn in synchronization with the unit turned by the user. Such a very simple operation makes it possible to arrange the key units 37 and 47 in a desired operating relation so that the user can operate the keyboard in the most favorable operating configuration.

Next, the locking system is explained below with reference to FIG. 3 for locking the first and second key units 37 and 47 to the first and second base plates 5 and 8 respectively after the key units 37 and 47 are synchronously turned to the desired positions.

The locking systems 57 are provided between the first base plate 5 and the first key unit 37 and between the second base plate 8 and the second key unit 47 respectively. Since these locking systems 57 are of identical structures, the following explanation is made on only the locking system 57 provided between the second base plate 8 and the second key unit 47. It is to be noted that the locking system 57 between the first base plate 5 and the first key unit 37 is constructed of locking recesses 45 formed on the circularly arcuate face 42 of the first gear member 44 disposed in the first support plate 6 of the first key unit 37 and a resilient locking piece (not shown) formed in the bearing member 13 at the corner 12 of the first base plate 5.

Here, the locking system 57 is provided in each of the first key unit 37 and the second key unit 47, but may be provided in only one of them.

In the locking system 57 shown in FIG. 3, the bearing member 17 formed at the corner 16 of the second base plate 8 is of a hollow shape in which a pair of holding portions 58 are formed. A resilient locking piece 59 made of a resilient metallic thin plate shaped like a Japanese syllabary character "<" (close to an L-shape) is supported at both ends between the pair of holding portions 58. A concave curved face 60 of the bearing member 17 in contact with the circularly arcuate face 52 of the second gear member 54 is formed with a hole 61 through which the apex of the locking piece 59 protrudes outwards. The apex of the locking piece 59 protruding through the hole 61 is engaged in one of a plurality of locking recesses 55 formed on the circularly arcuate face 52 of the second gear member 54.

When the first and second key units 37 and 47 are synchronously turned to desired positions, the apex of the locking piece 59 of the locking system 57 is engaged in the locking recess 55 of the second gear member 54 at that position, thereby locking the first and second key units 37 and 47 there. Accordingly, the keyboard can be operated stably in a fixed state favorable for individual users.

The locking system 57 is simply constructed of the locking recesses 55 formed on the circularly arcuate face 52 of the second gear member 54 and the resilient locking piece 59 disposed in the bearing member 17 in the second base plate 8. Thus, each locking system 57 for the first and second key units 37 and 47 can be realized at a low cost. The locking recesses 55 being formed on the circularly arcuate face 52 of the second gear member 54 can be made concurrently with the formation of the gear teeth 53. This makes it possible to further reduce the cost.

The following explanation is made on the control unit 101 with reference to FIGS. 1 and 2. The control unit 101 is united with the first keyboard unit 3 at one side thereof, along a direction perpendicular to the support shaft 19 in the connecting part 2. To this control unit 101, a lead wire extended from the lug 69A guided from the second keyboard unit 4 through the peripheral walls 24 and 23 and a lead wire extended from the lug 69B in the first keyboard unit 3 are in combination connected. Furthermore, a sheet-shaped lug 103 which is extended from the flexible display 102 and includes a plurality of signal wires is connected to the control unit 101. Such control unit 101 controls the keyboard 1 and the flexible display 102.

Two support recesses 104 and 105 are formed in the rear of the control unit 101. The support recess 104 has opposite inner wall surfaces in which a support hole 106 and a support shaft (not shown) are provided respectively. The support recess 105 has opposite inner wall surfaces in which support holes 111 (only one of them is shown) are formed respectively.

Furthermore, a pointing stick 116 is disposed in the control unit 101 to move a cursor or the like displayed on a display part 115 of the flexible display 102 to a desired position on the display part 115. When a switch 25A in the switch section 25 is pressed, the cursor or the like moved by operation of the pointing stick 116 is settled at the moved position.

Figure 6:
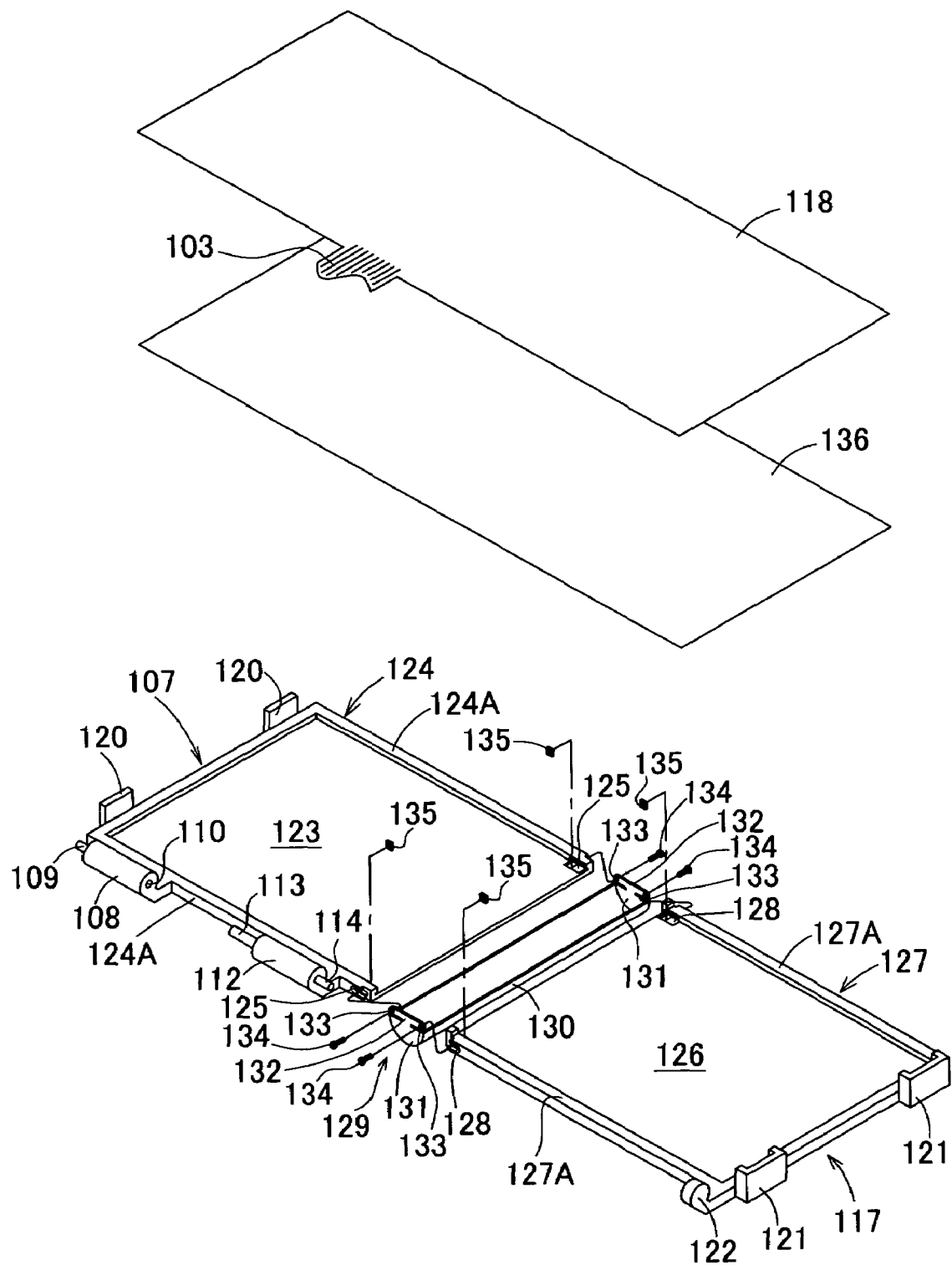
FIG. 6 is an exploded perspective view of a flexible display in the first embodiment.

The flexible display 102 is explained below with reference to FIGS. 1, 2, and 6. FIG. 6 is an exploded perspective view of the flexible display.

The flexible display 102 is mainly constructed of a color organic electroluminescence (EL) display 118 made of an organic EL device formed on a flexible plastic base film. This EL display 118 is placed over cover members 107 and 117 which are configured so as to be slidable with respect to each other. The EL display 118 can be folded with a curved portion owing to the flexibility of the base film as mentioned later. It is to be noted that a sheet-shaped lug 103 is extended from the base film of the EL display 118.

The cover member 107 is integrally formed at one side (a lower side in FIG. 1 and 2) with support parts 108 and 112. The support part 108 is formed with a support shaft 109 and a support hole 110 on the outer both end surfaces. The support shaft 109 is rotatably mounted in the hole 106 of the recess 104 in the control unit 101. The support hole 110 rotatably holds a support shaft not shown formed in the recess 104. The support part 112 is formed with support shafts 113 and 114 on the outer both end surfaces. The support shaft 113 is rotatably mounted in the hole 111 of the recess 115 in the control unit 101. Similarly, the support shaft 114 is rotatably held in a hole not shown of the recess 105.

The display part 115 constructed of the color organic EL display 118 in the flexible display 102 is of a length substantially equal to that of the keyboard 1 in which the first and second keyboard units 3 and 4 are arranged horizontally in side by side relation during use of the input device 100 as shown in FIGS. 1, 4, and 5. The flexible display 102 is rotatably supported in a cantilever relation with the control unit 101. The cover member 107 is integrally formed at the left side with two hooks 120 with locking lugs 119.

On the other hand, the cover member 117 is integrally formed at the right side with two engagement parts 121 corresponding to the hooks 120 of the cover member 107. When the input device 100 is folded, as mentioned later, the locking lugs 119 of the hooks 120 of the cover member 107 are engaged with the engagement parts 121 of the cover member 117. Furthermore, the cover member 117 is integrally formed at the right lower end with a projection 122. As mentioned above, the flexible display 102 opened in a flat state as shown in FIG. 1 is rotatably supported in a cantilever relation with the control unit 101. If the cover member 117 is held in noncontact with, or at a distance from, an installation plane on which the input device 100 is set for use, therefore, excessive stress may be concentrated on the support structure of the flexible display 102, which causes rattling of the display 102. In some case, furthermore, the cover member 117 of the display 102 would tilt downward. To prevent such defects, the projection 122 formed at the lower end of the cover member 117 is configured to have a lower surface which becomes flush with the bottom surface of the input device 100 in an operational state in order to stably support the cover member 117, namely, the display 102 on the installation plane without tilting. At this time, the above mentioned support shaft 109, support hole 110, support shafts 113 and 114 are axially aligned with the projection 122. Accordingly, the projection 122 does not obstruct the folding operation of the display 102.

The structure for slidably connecting the cover members 107 and 117 is explained below with reference to FIG. 6. In FIG. 6, a flat plate part 123 of the cover member 107 is circumferentially formed with a wall 124 shaped like a Japanese syllabary character "コ" (close to a U-shape) in plane view. This wall 124 includes a pair of opposite wall portions 124A. Near inner ends (right ends in FIG. 6) of the wall portions 124A, grooves 125 having closed ends are formed. A flat plate part 126 of the cover member 117 is circumferentially formed with a wall 127 shaped like a Japanese syllabary character "コ" in plane view. This wall 127 includes a pair of opposite wall portions 127A. Near inner ends (left ends in FIG. 6) of the wall portions 127A, grooves 128 having closed ends similarly to the grooves 125 are formed.

Moreover, a semicylindrical joint 129 is provided between the right end of the cover member 107 and the left end of the cover member 117. This joint 129 includes a semicylindrical body 130 and semicircular plates 131 closing both ends of the semicylindrical body 130. Each semicircular plate 131 is integrally formed with an elliptic link part 132 connected to the center of the straight edge of the plate 131. Each link part 132 is formed at both ends with screw holes 133 through which screws 134 pass. The screws 134 are engaged, with play, in the groove 125 formed in the wall portion 124A of the cover member 107 and in the groove 128 formed in the wall portion 127A of the cover member 117, individually. A nut 135 is tightened on the end of each screw 134. The linkage system is thus constructed to couple the cover members 107 and 117 through the joint 129.

By the linkage system mentioned above, the cover members 107 and 117 are connected with each other through the screws 134 engaged in the grooves 125 and 128 and the screw holes 133 of the link parts 132 of the joint 129. Since the screws 134 are slidable along the grooves 125 and 128, the cover members 107 and 117 are slidable with respect to each other A resilient metallic thin plate 136 having plate spring characteristics, made of for example stainless steel, is laminated to the lower surface (rear surface) of the organic EL display 118. This resilient metallic thin plate 136 is supported and placed over the flat plate part 123 of the cover member 107, the open side of the joint 129, and the flat plate part 126 of the cover member 117. Accordingly, the flexible display 118 is supported and placed, through the resilient metallic thin plate 136, on the flat plate part 123 of the cover member 107, the open side of the joint 129, and the flat plate part 126 of the cover member 117. In cooperation with the resilient force of the plate 136, the flexible display 118 can be held flat in an open state. This makes it possible to prevent the occurrence of a corrugating phenomenon in the flexible display 118, thereby allowing letters and others to be stably displayed.

One edge (a left short side) of the EL display 118 to which the resilient metallic thin plate 136 is laminated is fixed to the left portion (in FIG. 6) of the wall 124 of the cover member 107. The peripheral edges (including both long sides and a right short side in FIG. 6) of the EL display 118 except for the above one edge (the left short side) are slidably held in a circumferential groove (not shown) formed in the entire inner surface of the wall 124 of the cover member 107 and a circumferential groove (not shown) formed in the entire inner surface of the wall 127 of the cover member 117. As mentioned above, the EL display 118 is allowed to slide along the circumferential grooves in the cover members 107 and 117 when the cover members 107 and 117 are slid to come close to or away from each other.

It is to be noted that the EL display 118 is folded after the cover members 107 and 117 are slid to come away from each other, as mentioned later, and the EL display 118 is unfolded from the folded state and then the cover members 107 and 117 are slid to come close to each other, bringing the EL display 118 into a flat displayable state shown in FIG. 1. During the sliding operation of the cover members 107 and 117, the EL display 118 is slid along the circumferential grooves of the cover members 107 and 117, so that the EL display 118 can be held in the flat state. Adhered with the resilient metallic thin plate 136 on the lower (rear) surface, the EL display 118 can easily and rapidly be returned to the flat state from the folded state due to the resilient force of the plate 136. Accordingly, the EL display 118 can surely be prevented from becoming liable to automatically bend with a fold line.

Since the joint 129 has the integral link parts 132 of the semicircular plates 131 and the screws 134 are put through the screw holes 133 of the link parts 132, the grooves 125 of the cover member 107, and the grooves 128 of the cover member 117 to connect the cover members 107 and 117, the link parts 132 integrally formed in the semicircular plates 131 are allowed to operate in sync with each other. Thus, the cover members 107 and 117 in the flexible display 102 can be opened and closed in a stable state, not in a tilted state.

Figure 7:
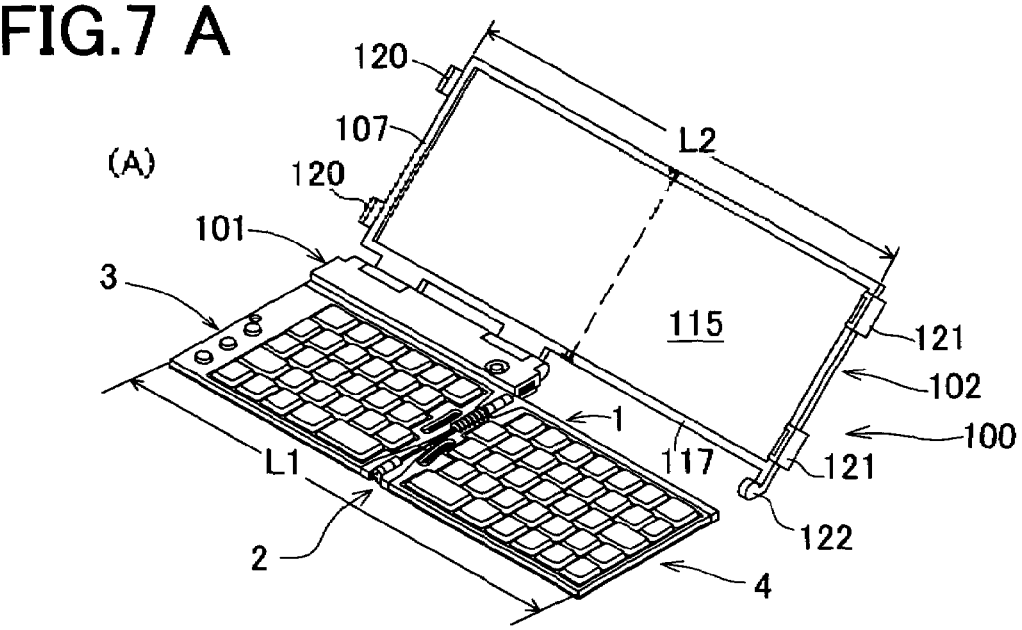
FIG. 7A is an explanatory view of an input device with a keyboard and a flexible display set in an operational state.
FIG. 7B is an explanatory view showing a state where the keyboard is close to being completely folded.
FIG. 7C is an explanatory view showing a state where the keyboard is completely folded.
Figure 7:
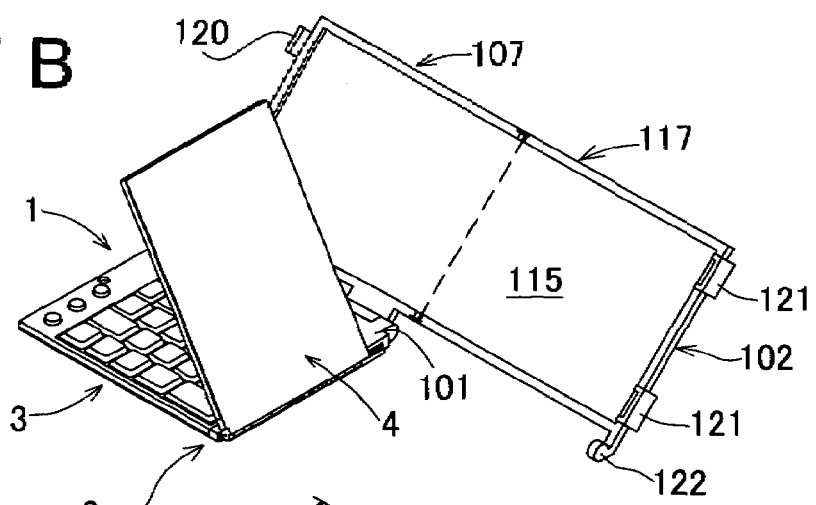
Figure 7:
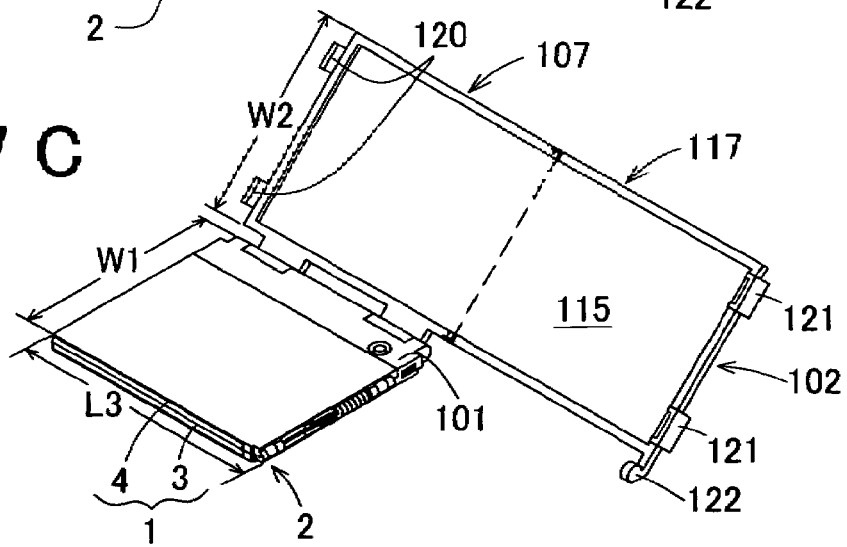
Figure 8:
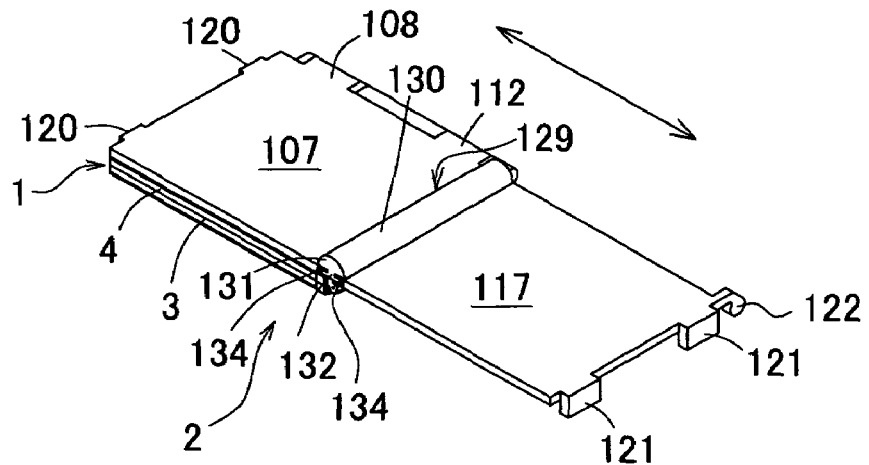
FIG. 8A is an explanatory view showing a state where the flexible display is rotated from the state in FIG. 7C to come into contact with an upper surface of the keyboard folded.
FIG. 8B is an explanatory view showing a state where the cover members are slid to come apart from each other from a state in FIG. 8A.
FIG. 8C is an explanatory view of the flexible display in a completely folded state after rotation of one of the cover members, the one being in noncontact with the upper surface of the keyboard, from a state in FIG. 8B to come into contact with a lower surface of the keyboard.
Figure 8:
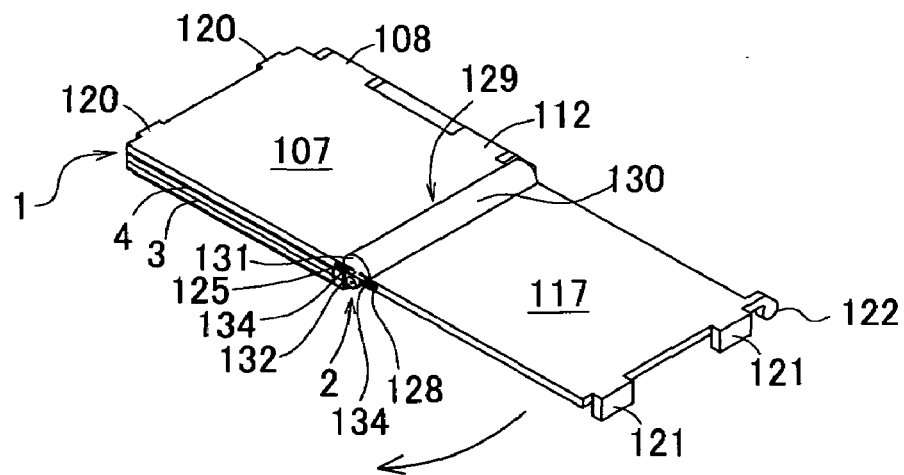
Figure 8:
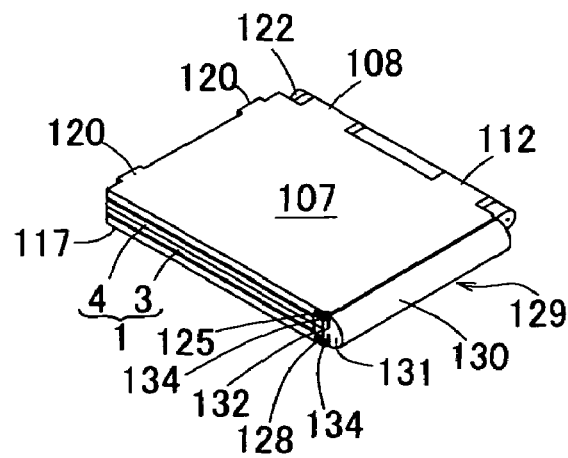

Next, the folding operation of the above structured input device 100, i.e. the keyboard 1 and the flexible display 102, is explained with reference to FIGS. 7 and 8. FIGS. 7 are explanatory views showing a process of sequentially folding the keyboard of the input device from an operational state. Specifically, FIG. 7A is an explanatory view of the input device with the keyboard and the flexible display each set in an operational state; FIG. 7B is an explanatory view a state where the keyboard is close to being completely folded; and FIG. 7C is an explanatory view showing a state where the keyboard is completely folded. Furthermore, FIGS. 8 are explanatory views showing a process of sequentially folding the flexible display after folding the keyboard. Specifically, FIG. 8A is an explanatory view showing a state where the flexible display is rotated from the state in FIG. 7C to come into contact with an upper surface of the keyboard folded; FIG. 8B is an explanatory view showing a state where the cover members are slid to come apart from each other from a state in FIG. 8A; and FIG. 8C is an explanatory view of the flexible display in a completely folded state after rotation of one of the cover members, the one being in noncontact with the upper surface of the keyboard, from a state in FIG. 8B to come into contact with a lower surface of the keyboard.

At first, in the operational state of the input device 100, as shown in FIG. 7A, the first and second keyboard units 3 and 4 constituting the keyboard 1 are horizontally held after rotated through the connecting part 2 in a direction to separate from each other. Thus, the operation area of those units 3 and 4 becomes equivalent to that of the keyboard of a desktop type computer, whereby to achieve improved key operationality.

In this state, the length of a long side of the keyboard 1 is assumed to be "L1". In the operational state of the input device 100, similarly, the color organic EL display 118 placed over the cover members 107 and 117 in the flexible display 102 is held flat so as to display letters or other various information input with the keyboard 1 in full-size, where the length of a long side of the flexible display 102 is assumed to be "L2". Accordingly, the length of the display part 115 constructed of the color organic EL display 118 in the flexible display 102 is substantially equal to the length L1 of the keyboard 1. The display part 115 of the flexible display 102 has a wide displaying area, making the letters or other information displayed thereon easily viewable and having no restriction in displaying the letters or others.

It is to be noted that FIG. 7A shows a state of the flexible display 102 unfolded from the folded state to the flat state. At this time, the display 102 is extended in parallel with the long side of the keyboard 1 constructed of the first and second keyboard units 3 and 4 horizontally arranged. The display part 115 is disposed in parallel with the long side of the keyboard 1 in the operational state, so that the flexible display 102 in operation of the keyboard 1 is easily viewable and the key operationality can be improved.

The lower surface of the projection 122 formed at the right lower end of the cover member 117 is flush with the bottom surfaces of the keyboard 1 and the control unit 101 in operation. Accordingly, the flexible display 102, which is supported in a cantilever state with respect to the control unit 101, can be stably supported in a horizontal state without causing the cover member 117 to tilt downward.

When the second keyboard unit 4 is rotated leftwards about the connecting part 2 from the state shown in FIG. 7A, it is brought into the state shown in FIG. 7B. When the second keyboard unit 4 is further rotated leftward, it is superposed on the first keyboard unit 3 as shown in FIG. 7C. The length of the keyboard 1 in a folded state of the first and second keyboard units 3 and 4 is determined to be "L3". The total width W1 of the width of the first keyboard unit 3 (equal to the width of the second keyboard unit 4) and the width of the control unit 101 is set to be equal to the width W2 of the flexible display 102.

Furthermore, the flexible display 102 is turned down toward the keyboard 1 from the state shown in FIG. 7C to bring the wall 124 of the cover member 107 into contact with the upper surface of the folded keyboard 1 (namely, the bottom surface of the second keyboard unit 4). This state is shown in FIG. 8A.

Figure 9:
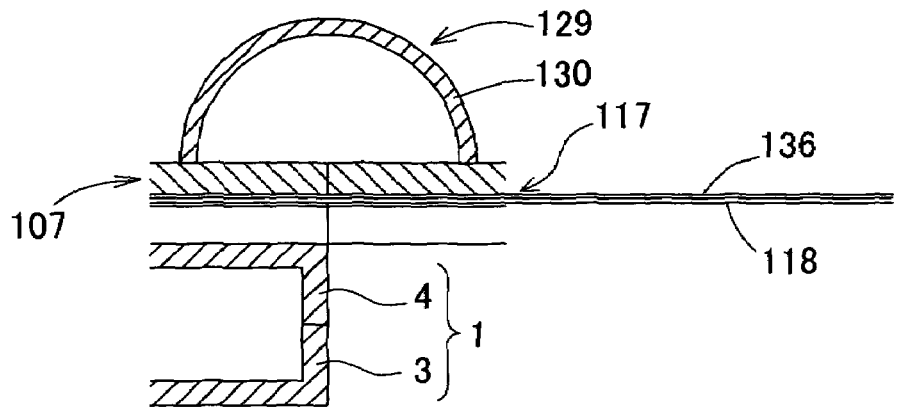
FIG. 9A is an enlarged sectional view of a structure around a joint of the flexible display in a flat state.
FIG. 9B is an enlarged sectional view of the structure around the joint of the flexible display with the cover members having been slid outwards to come apart from each other from a state in FIG. 9A.
FIG. 9C is an enlarged sectional view of the structure around the joint of the flexible display when the color organic EL display is in a completely folded state after rotation of the cover member from the state in FIG. 9B.
Figure 9:
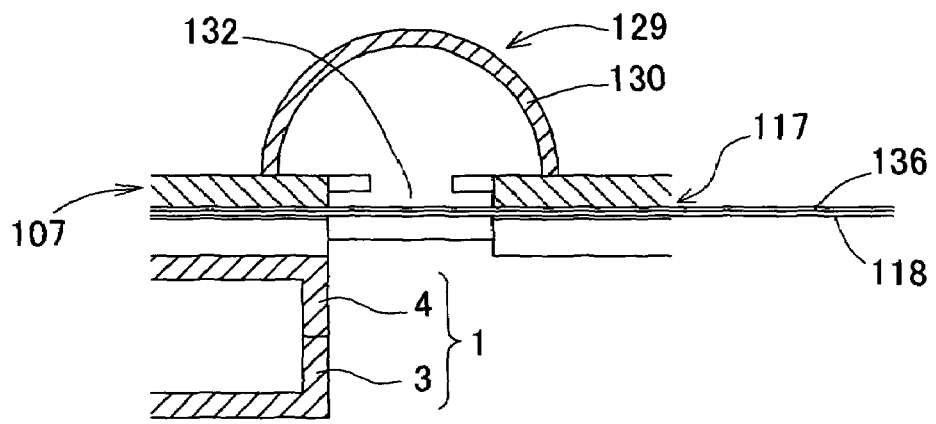
Figure 9:
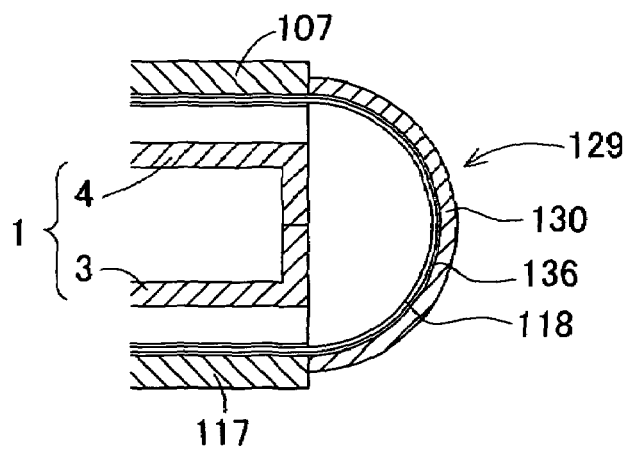
Figure 10:
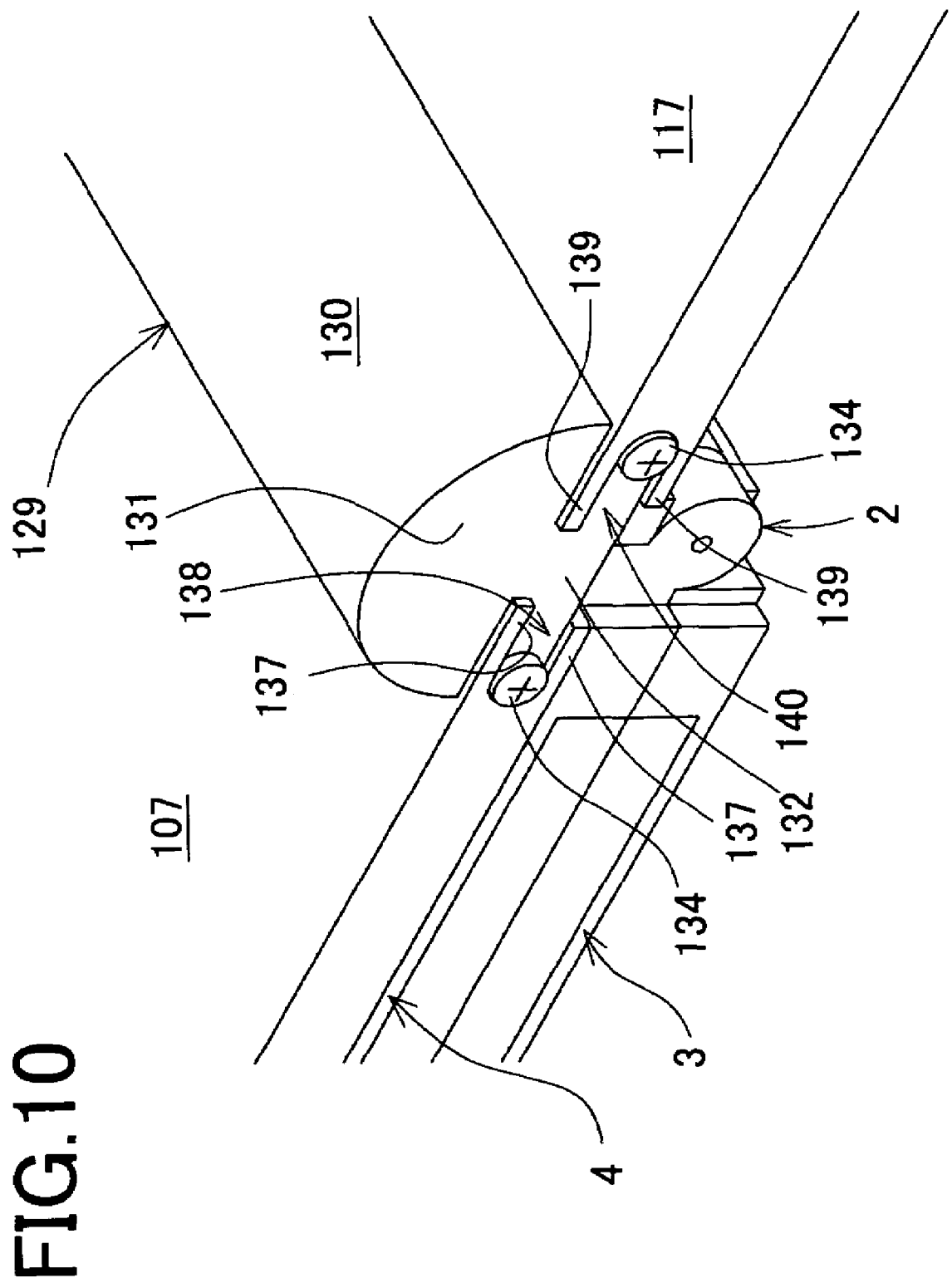
FIG. 10 is an enlarged perspective view of the structure around the joint of the flexible display in the flat state.

In this state, the cover members 107 and 117 of the flexible display 102 are held in a fixed relation after slid to the joint 129 side. This state is explained below with reference to FIG. 9A and FIG. 10. FIG. 9A is an enlarged sectional view of a structure around the joint of the flexible display in a flat state. FIG. 10 is an enlarged perspective view of the structure around the joint of the flexible display in the flat state.

In FIG. 10, each wall portion 124A in the cover member 107 is formed with shoulder portions 137 outside the groove 125 (see FIG. 6). Utilizing the shoulder portions 137, a groove 138 of a sideways U-shape opened at the right side is formed. Similarly, each wall portion 127A of the cover member 117 is formed with shoulder portions 139 outside the groove 128. Utilizing the shoulder portions 139, a groove 140 of a sideways U-shape opened at the left side is formed.

In the state where the cover members 107 and 117 have been slid to the joint 129 side, the screw 134 in the cover member 107 is in contact with the left end of the groove 125 and therefore in contact with the left end of the U-shaped groove 138, and the screw 134 in the cover member 117 is in contact with the right end of the groove 128 and therefore in contact with the right end of the U-shaped groove 140. In this state, the upper shoulder portion 137 is fit in a clearance between the link part 132 and the semicircular plate 131 and the upper shoulder portion 139 is similarly fit in another clearance between the link part 132 and the semicircular plate 131. With this structure, the cover members 107 and 117 are locked with respect to the joint 129. The cover members 107 and 117 are held against turning, thus keeping the organic EL display 118 in a flat state.

It is to be noted that FIG. 9A shows a sectional view of the state shown in FIG. 10. In FIG. 9A, the cover members 107 and 117 are placed after sliding to the joint 129 side such that each end surface of the two wall portions 124A of the cover member 107 abuts on each end surface of the two wall portions 127A of the cover member 117.

Figure 11:
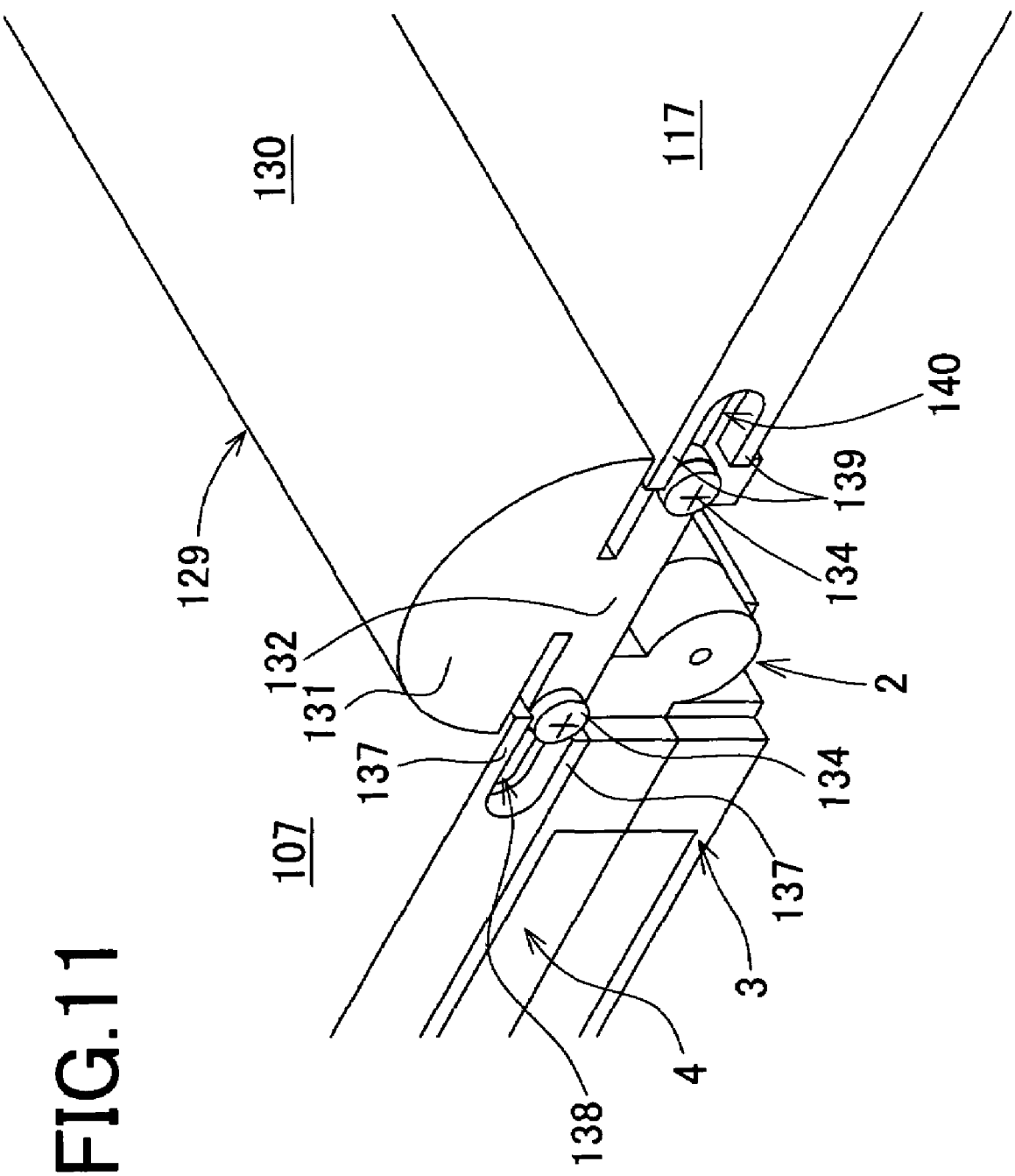
FIG. 11 is an enlarged perspective view of the structure around the joint of the flexible display with the cover members having been slid outwards to come away from each other from the state in FIG. 9A.

Returning to FIG. 8A, the cover members 107 and 117 are slid outwards (as indicated by an arrow in FIG. 8A) from the state shown in FIG. 8A to come away from each other into the state shown in FIG. 8B. This sliding state is explained with reference to FIG. 9B and FIG. 11. FIG. 9B is an enlarged sectional view of the structure around the joint of the flexible display with the cover members having been slid outwards to come apart from each other from the state in FIG. 9A. FIG. 11 is an enlarged perspective view of the structure around the joint of the flexible display with the cover members having been slid outwards to come away from each other from the state in FIG. 9A.

When the cover members 107 and 117 are slid outwards respectively, the screw 134 comes into contact with the right end of the groove 125 and therefore is moved from the left closed end to an open right end of the U-shaped groove 138. This state is shown in FIG. 11. Simultaneously, the upper shoulder portion 137 is disengaged from the clearance between the link part 132 and the semicircular plate 131 and similarly the upper shoulder portion 139 is disengaged from the other clearance between the link part 132 and the semicircular plate 131. Thus, the locking relation between the cover members 107 and 117 and the joint 129 is released to allow the cover members 107 and 117 to rotate, making the organic EL display 118 foldable.

It is to be noted that FIG. 9B shows a sectional view of the state shown in FIG. 11. In FIG. 9B, each end surface of the two wall portions 124A of the cover member 107 are in separate relation from each end surface of the wall portions 127A of the cover member 117.

Thereafter, the cover member 117 is rotated downward (clockwise) as indicated by an arrow in FIG. 8B to come into contact with the lower surface of the folded keyboard 1 (the bottom surface of the first keyboard unit 3) and the locking lugs 119 of the hooks 120 in the cover member 107 are engaged with the engagement parts 121 of the cover member 117, thereby locking the cover members 107 and 117 to each other in a folded state.

At this time, one edge of the color organic EL display 118 is fixed in the left portion of the wall 124 of the cover member 107 and the peripheral edges of the display 118 except for the one edge are slidably held in the circumferential groove formed in each inner surface of the walls 124 and 127. When the cover members 107 and 117 are folded as above, the color organic EL display 118 is folded to cover the upper and lower surfaces of the keyboard 1 in the folded state where the first and second keyboard units 3 and 4 are laid one on top of the other. In this folding operation, the display 118 is folded while the edges thereof are slid in the circumferential grooves of the cover members 107 and 117 in association with the folding motions thereof so that a part of the display 118 is curved along the curved inner surface of semicylindrical body 130 of the joint 129. It is to be noted that FIG. 9C is an enlarged sectional view of the structure around the joint of the flexible display when the color organic EL display is in a completely folded state after rotation of the cover member from the state in FIG. 9B.

For carrying of the input device 100 during which the keyboard 1 is not used, the color organic EL display 118 is folded to a length equal to the length L3 of the folded keyboard 1. That is, the display 118 can be folded in correspondence with the folded state of the keyboard 1. Accordingly, the portability of the whole input device 100 during carrying can extremely be enhanced.

The curvature of the curved portion of the display 118 can be increased, so that the display 118 can be prevented from being formed with a fold line in the curved portion. Thus, the flatness of the display 118 can be maintained over a long time.

Furthermore, the width W2 of the flexible display 102 is determined to be equal to the total width W1 of the first keyboard unit (the second keyboard unit) and the control unit 101. The flexible display 102 in a folded state is thus equal in size to the total size of the first keyboard unit 3 and the control unit 101. Accordingly, it is possible to prevent the occurrence of difference in size between the keyboard 1 and the flexible display 102 in the folded state and achieve a compact and unitized device.

Figure 12:
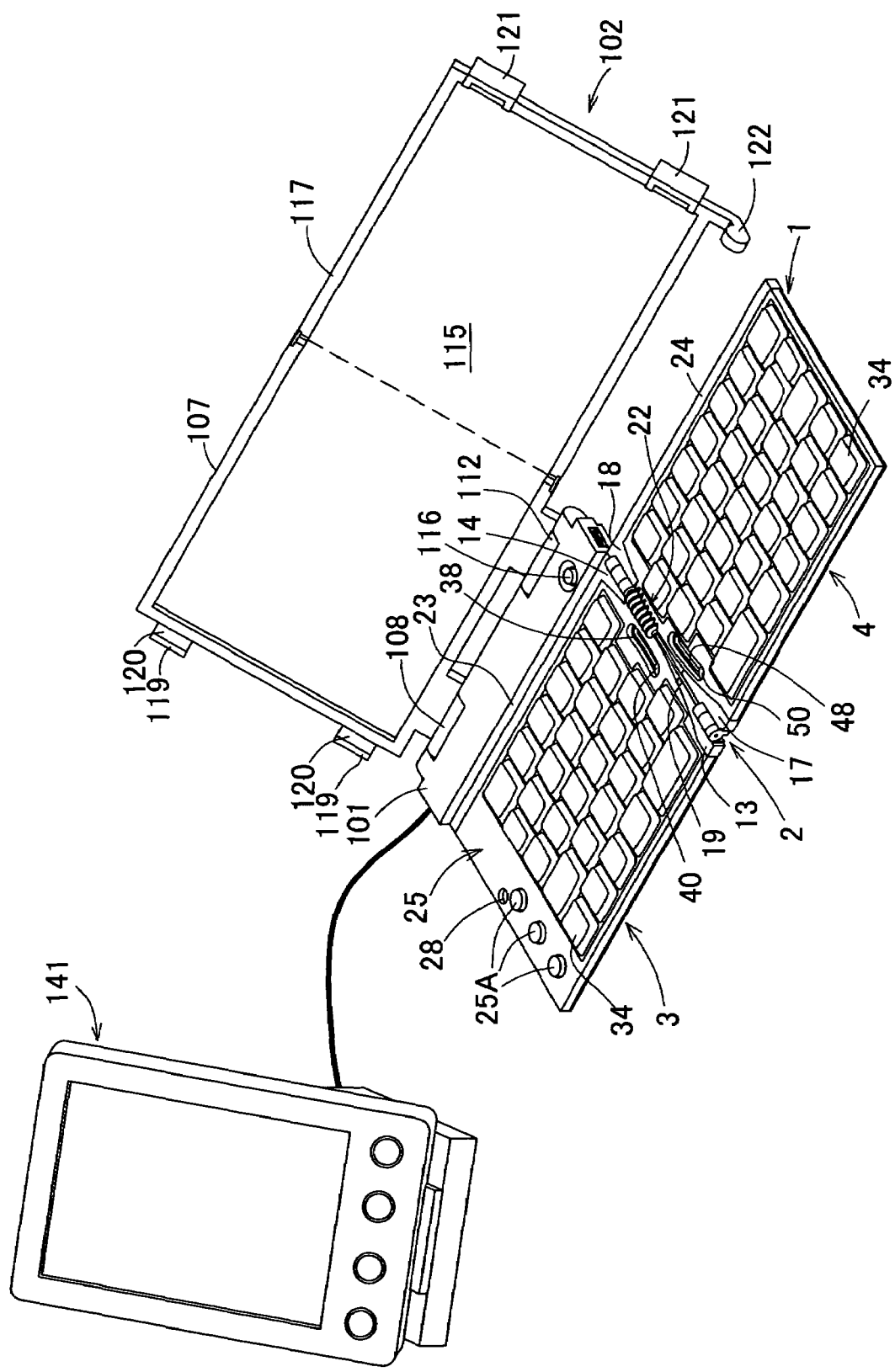
FIG. 12 is a perspective view of the input device connected to a PDA.
Figure 13:
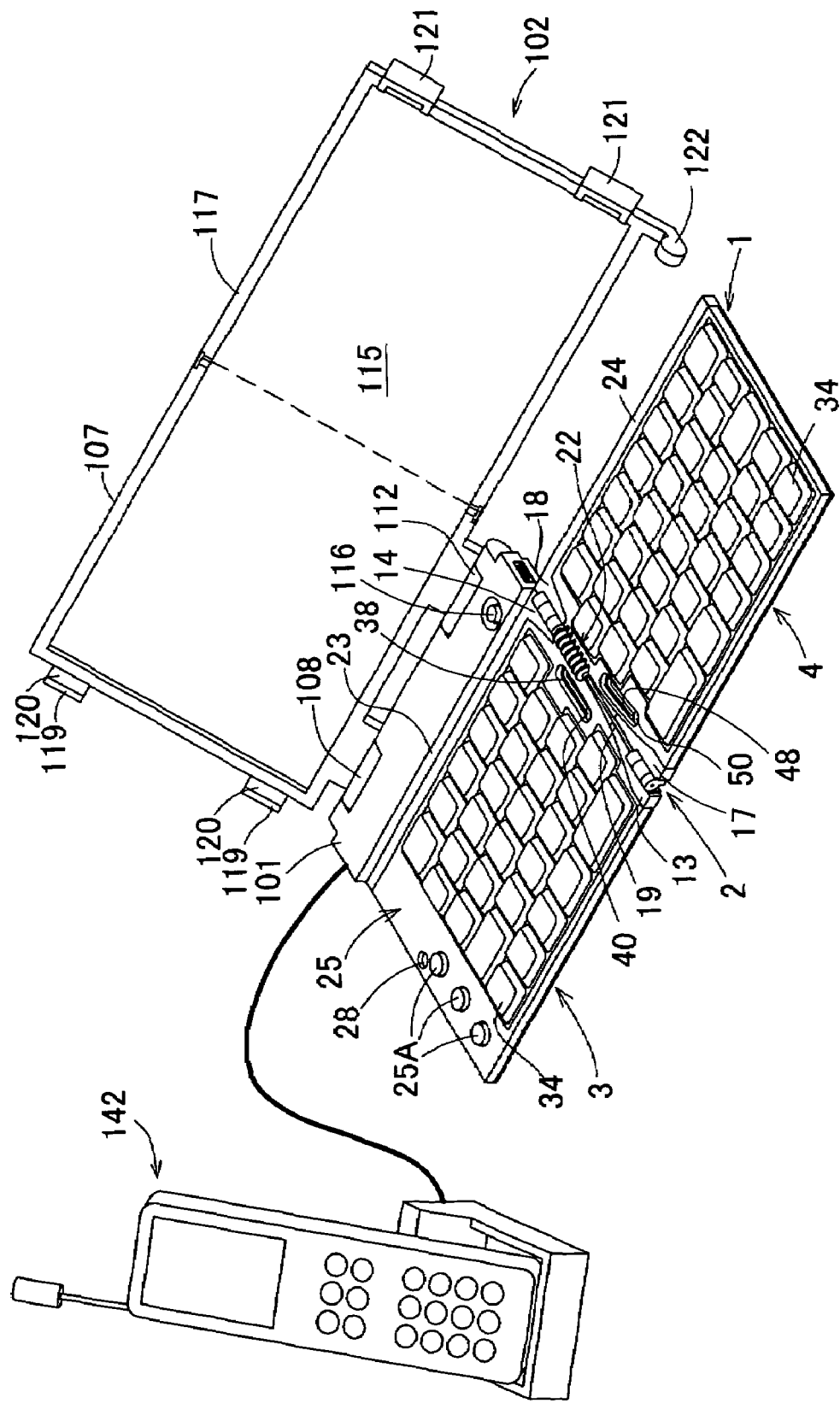
FIG. 13 is a perspective view of the input device connected to a cell phone.

Operational patterns of the input device 100 constructed as above include the following examples. As shown in FIG. 12, a personal digital assistance (PDA) 141 is connected to the control unit 101 so that the input device 100 is used as a data input device for the PDA 141. As shown in FIG. 13, a cell phone 142 is connected to the control unit 101 so that the input device 100 is used as a data input device for the cell phone 142. In these operational patterns, the input device 100 can solve inconveniences of the PDA 141 and the cell phone 142 which have data input keys so small in number and size as to make data input difficult and troublesome and have so small displays as to make displayed data hard to see. The device 100 can be utilized with the data input ability and data display ability equivalent to those of the desktop type device.

Figure 14:
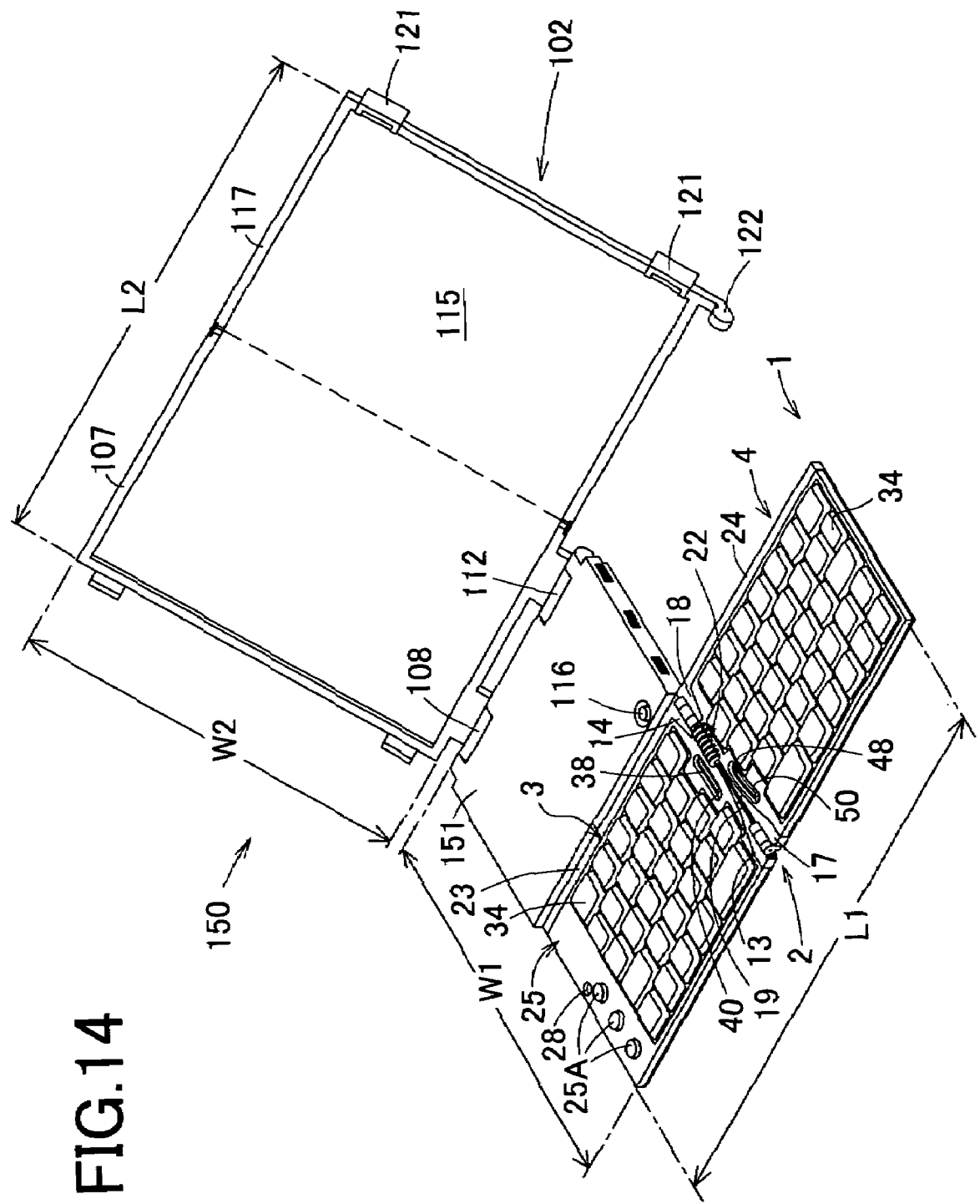
FIG. 14 is a perspective view of a notebook-size personal computer.

Using the above mentioned keyboard 1 and flexible display 102, a foldable notebook-size personal computer as shown in FIG. 14 can be realized. FIG. 14 is a perspective view of the notebook-size personal computer.

In the notebook-size personal computer 150 in FIG. 14, a computer main unit 151 is united with the first keyboard unit 3 at one side thereof, instead of the control unit 101 in the above mentioned input device 100. It is to be noted that the structures of the keyboard 1 and the flexible display 102 are identical to those in the input device 100.

In this case, similar to the input device 100, the length L1 of the unfolded keyboard 1 in which the first and second keyboard units 3 and 4 are horizontally arranged and the length L2 of the flexible display 102 in a horizontal state are determined to be equal. The width W1 of the first keyboard unit 3 (the second keyboard unit 4) and the width W2 of the flexible display 102 are determined to be equal.

Such notebook-size personal computer 150 can also provide the same effects as those in the case of the input device 100.

Next, a second embodiment of the input device according to the present invention will be explained below. The input device in this embodiment is of an identical structure to that in the first embodiment except for the following points. Like members and elements corresponding to those in the first embodiment are indicated by like numerals.

In the input device 100 in the first embodiment, specifically, the landscape flexible display 102 is structured by the color organic EL display 118 which covers over the cover member 107 rotatably supported on one side of the control unit 101 and the cover member 117 constructed to be slidable with respect to the cover member 107 through the joint 129 and which is placed in parallel with the long side of the horizontally held keyboard 1 (each long side of the keyboard units 3 and 4). The input device 100 is folded by folding the keyboard 1 and then folding the flexible display 102 along the long sides of the keyboard units 3 and 4 so as to cover the upper and lower surfaces of the folded keyboard 1.

In an input device 100 in the second embodiment, on the other hand, a color organic EL display 118 is constructed of cover members 107 and 117 connected with each other through a joint 129 along the short side of each keyboard unit 3 and 4, thus constituting a portrait flexible display 102. The input device 100 is folded by folding the keyboard 1 and then folding the flexible display 102 along the short sides of the keyboard units 3 and 4 so as to cover the upper and lower surfaces of the keyboard 1. It is to be noted that the other elements of the input device 100 in the second embodiment are identical to those in the first embodiment. Thus, the following explanation is made with a focus on specific features in the input device 100 in the second embodiment.

Figure 15:
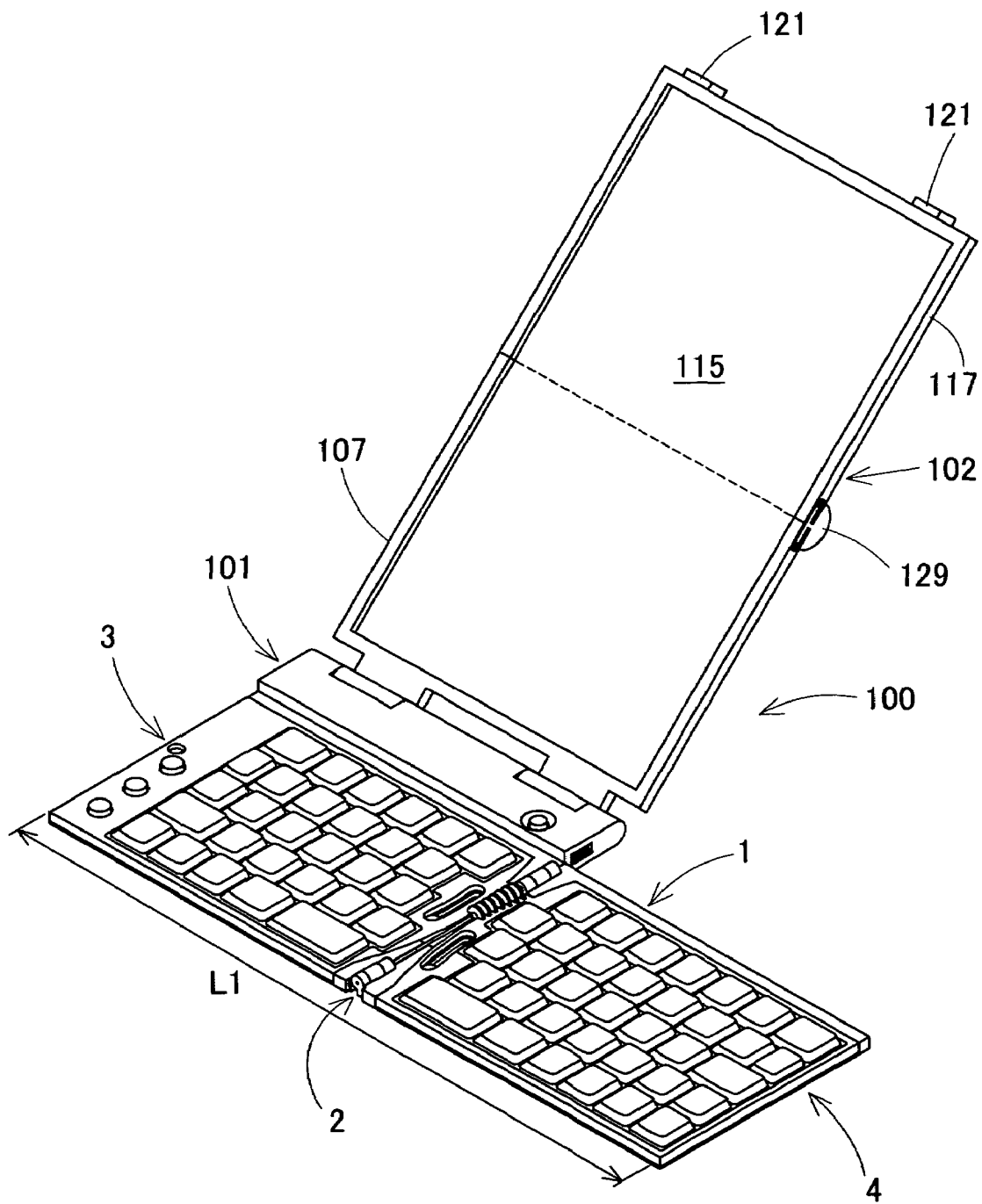
FIG. 15 is a perspective view of an input device in a second embodiment, in which a keyboard and a flexible display are set in an operational state.

The input device 100 in the second embodiment is explained with reference to FIG. 15. FIG. 15 is a perspective view of the input device 100. In FIG. 15, the cover member 107 is supported to be rotatable in a back and forth direction with respect to a control unit 101. The cover member 117 is connected with the cover member 107 through the joint 129 so that the cover member 117 is slidable to extend upwards. The color organic EL display 118 is placed over the cover members 107 and 117. The thus structured flexible display 102 is provided with the portrait display part 115 constructed of the color organic EL display 118 as shown in FIG. 15. This portrait display part 115 is suitable for displaying the document data input through the keyboard 1 in portrait orientation.

The display part 115 is of a width substantially equal to the length L3 of the folded keyboard 1 (see FIG. 17) corresponding to the long side of each keyboard 3 and 4.

Figure 16:
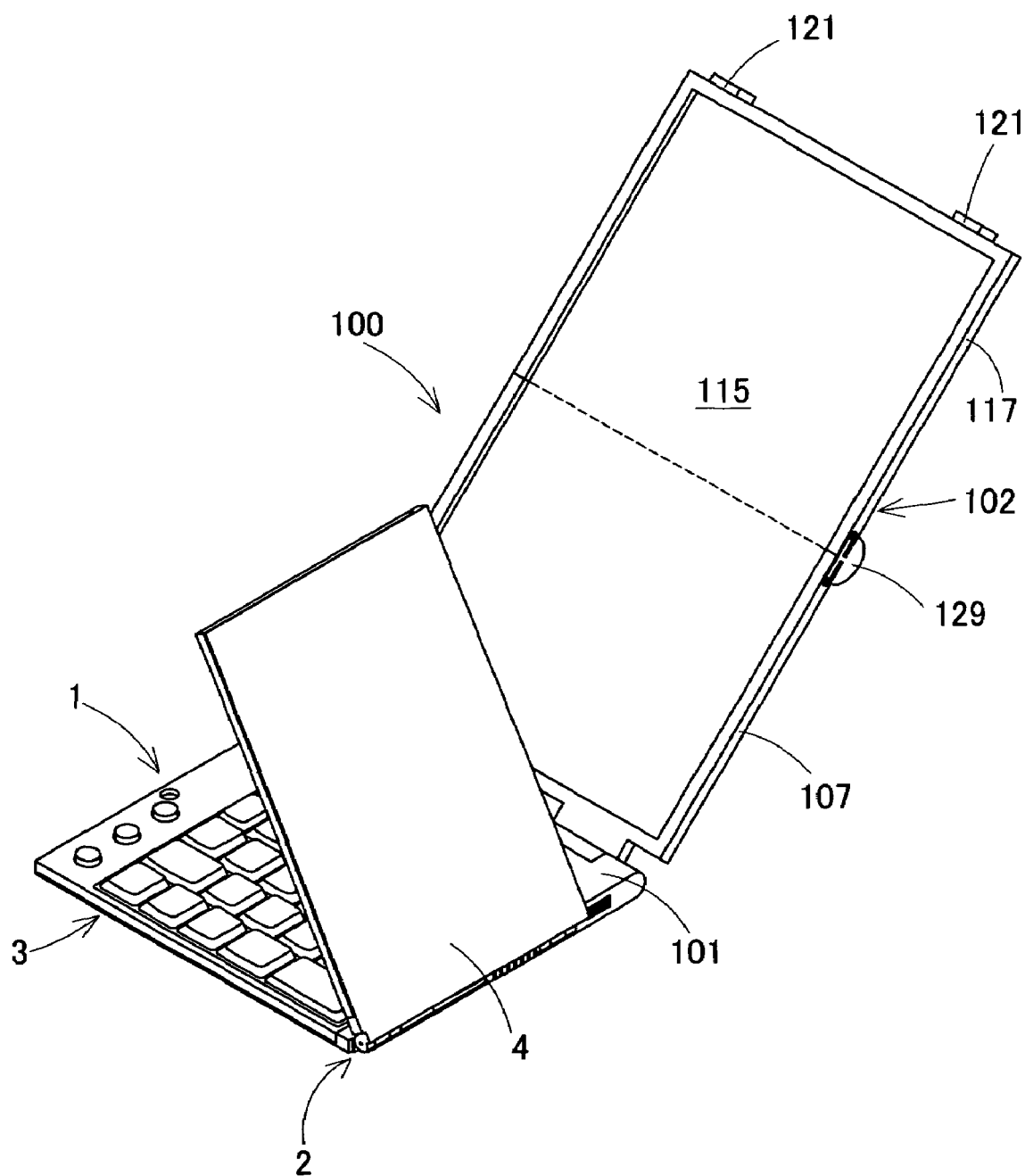
FIG. 16 is an explanatory view showing a state where the keyboard is close to being completely folded.
Figure 17:
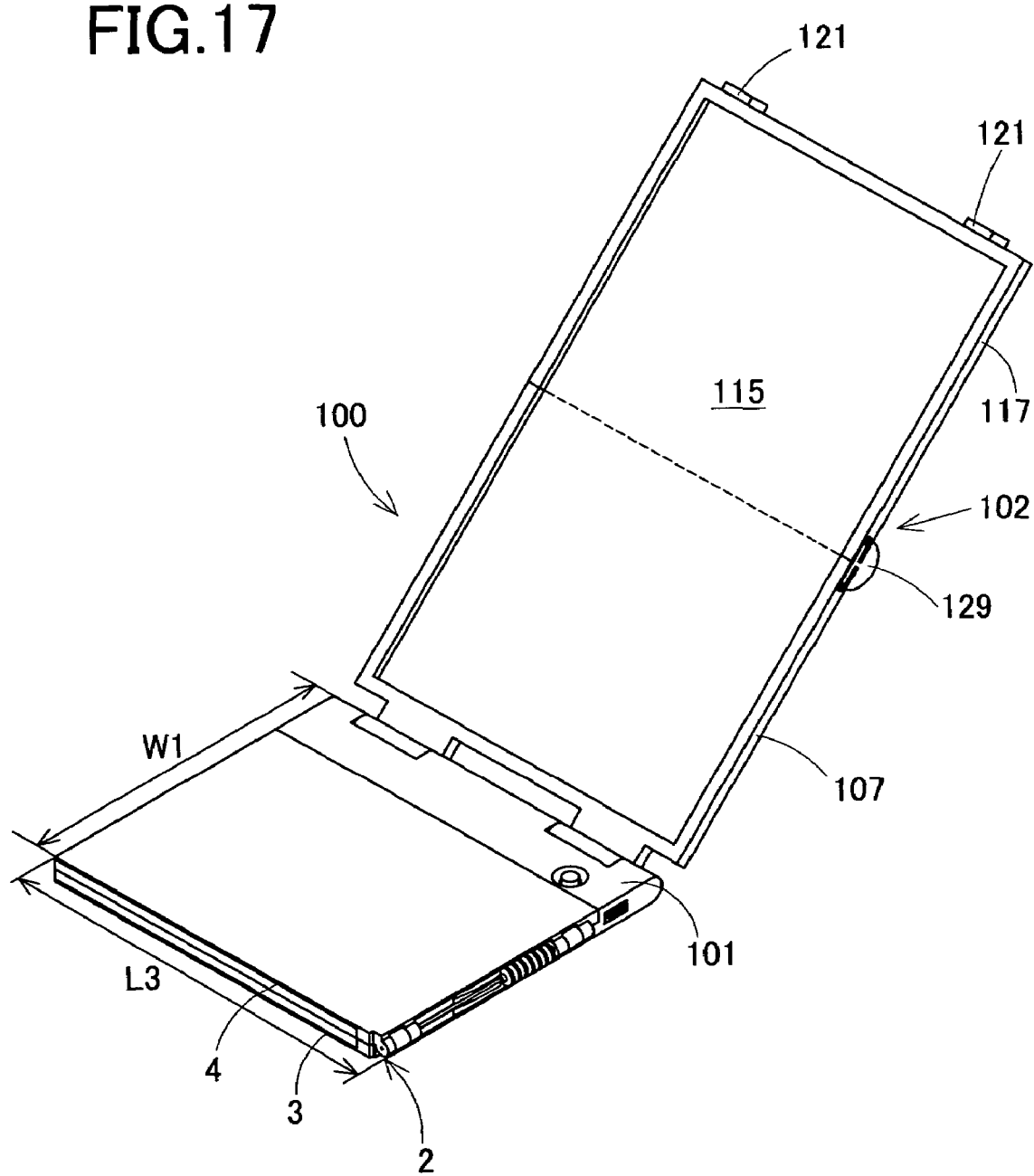
FIG. 17 is an explanatory view showing a state where the keyboard is completely folded.
Figure 18:
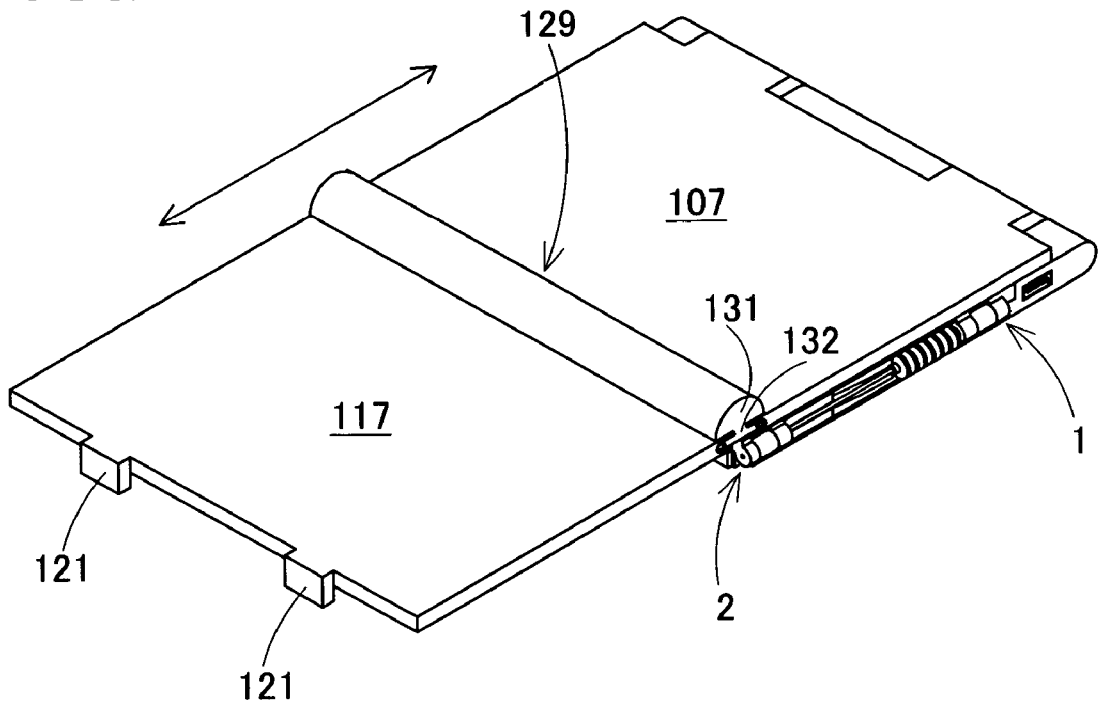
FIG. 18 is an explanatory view showing a state where the flexible display is rotated from the state in FIG. 17 to come into contact with the upper surface of the folded keyboard.
Figure 19:
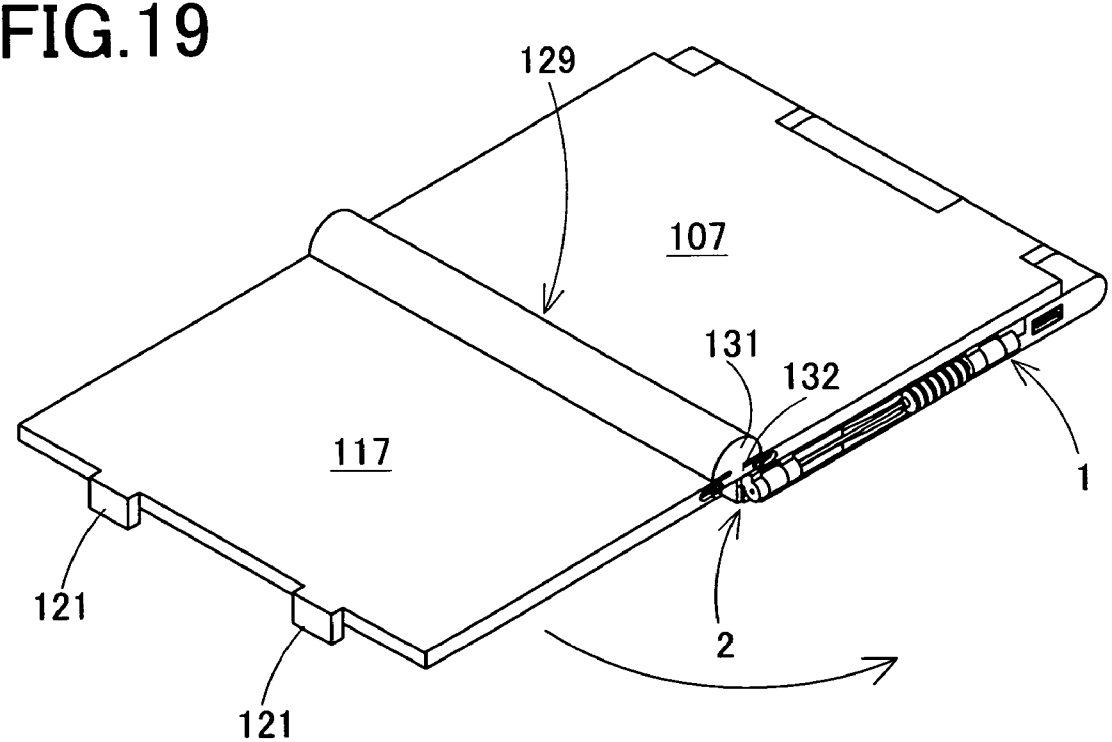
FIG. 19 is an explanatory view showing a state where the cover members are slid to come apart from each other from the state in FIG. 18.
Figure 20:
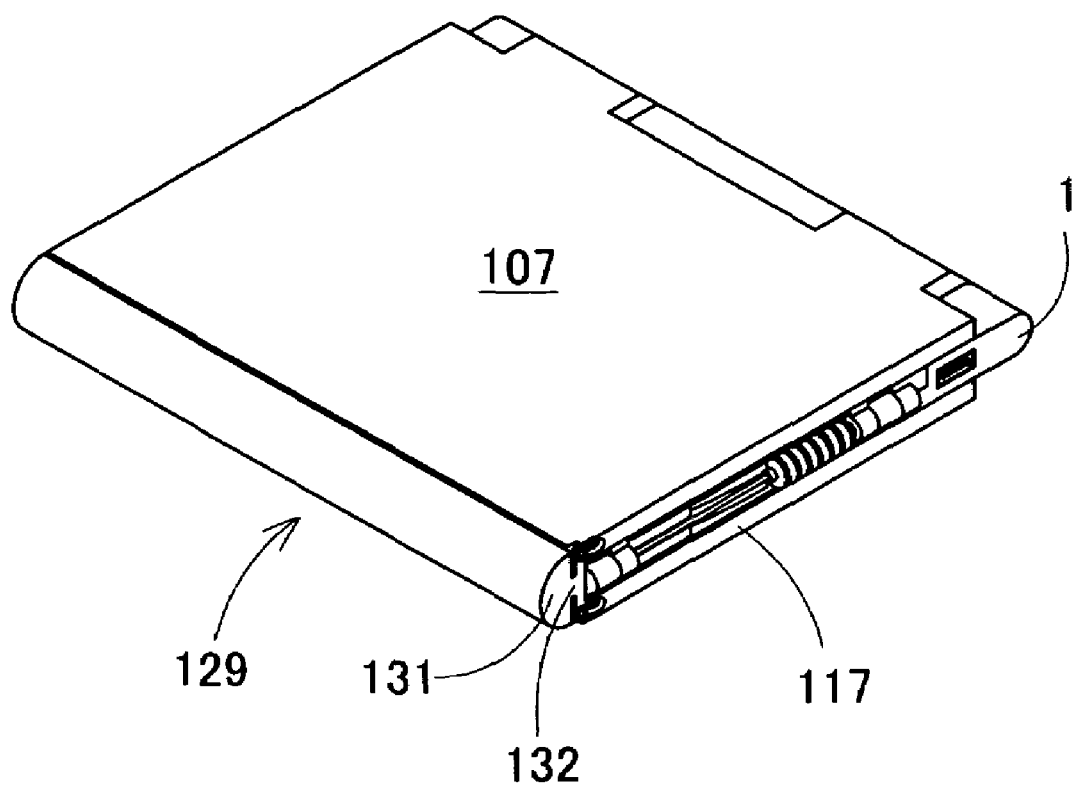
FIG. 20 is an explanatory view showing the flexible display in a completely folded state after rotation of one of the cover members, the one being in noncontact with the upper surface of the keyboard, from the state in FIG. 19 to come into contact with the lower surface of the keyboard.

The folding operation of the keyboard 1 and the flexible display 102 in the input device 100 constructed as above is explained below with reference to FIGS. 15 through 20. FIG. 15 is an explanatory view of the input device in which the keyboard 1 and the flexible display 102 are set in an operational state. FIG. 16 is an explanatory view showing a state where the keyboard 1 is close to being completely folded. FIG. 17 is an explanatory view showing a state where the keyboard 1 is completely folded. FIG. 18 is an explanatory view showing a state where the flexible display is rotated from the state in FIG. 17 to come into contact with the upper surface of the folded keyboard. FIG. 19 is an explanatory view showing a state where the cover members are slid to come apart from each other from the state in FIG. 18. FIG. 20 is an explanatory view showing the flexible display in a completely folded state after rotation of one of the cover members, the one being in noncontact with the upper surface of the keyboard, from the state in FIG. 19 to come into contact with the lower surface of the keyboard.

At first, in the operational state of the input device 100, as shown in FIG. 15, the first and second keyboard units 3 and 4 constituting the keyboard 1 are held in a horizontal state (an unfolded state) after rotated to come apart from each other through the connecting part 2. Accordingly, the first and second keyboard units 3 and 4 can be equivalent in operation area to the keyboard of a desktop type computer, enhancing the key operationality.

When the second keyboard unit 4 is rotated about the connecting part 2, leftwards along the long side of each keyboard unit 3 and 4 from the state shown in FIG. 15, the second keyboard unit 4 is brought into a state shown in FIG. 16. When the keyboard unit 4 is further rotated leftwards, it is put on the first keyboard unit 3, as shown in FIG. 17. In this state, the length of the folded keyboard 1, namely, the first and second keyboard units 3 and 4 superposed one on top of the other, is set to be "L3". The total width of the short side of the first keyboard unit 3 (the second keyboard unit 4) and the control unit 101 is set to be "W1". The length of the portrait flexible display 102 (the vertical length in FIG. 17) is set to be almost twice the width W1.

Then, the flexible display 102 is turned down along the short side of the keyboard 3 from the state in FIG. 17 toward the keyboard 1 to bring the wall 124 of the cover member 107 into contact with the upper surface of the folded keyboard 1 (the bottom surface of the second keyboard 4). This state is shown in FIG. 18.

In this state, the cover members 107 and 117 of the flexible display 102 are in a slid and locked state with respect to the joint 129 as those in the first embodiment.

Subsequently, the cover members 107 and 117 are slid outwards from the state in FIG. 18 as indicated by an arrow in FIG. 18, releasing the locking relation between the cover members 107 and 117 and the joint 129. This released state is shown in FIG. 19, in which each cover member 107 and 117 becomes rotatable, thus bringing the organic EL display 118 into a foldable state.

Thereafter, the cover member 117 is rotated downward (clockwise) as indicated by an arrow in FIG. 19 along the short side of the keyboard unit 3 and brought into contact with the lower surface of the folded keyboard 1 (the bottom surface of the first keyboard unit 3) as mentioned above. Locking lugs 119 of hooks 120 formed in the cover member 107 are then engaged with engagement parts 121 of the cover member 117, thereby locking the cover members 107 and 117 to each other in a folded state.

At this time, one edge (a lower short side in FIG. 15) of the color EL display 118 is fixed in the lower portion (in FIG. 15) of the wall 124 of the cover member 107 and the peripheral edges (including both long sides and an upper short side in FIG. 15) of the display 118 except for the one edge (the lower short side) are slidably held in the circumferential groove formed in each inner surface of the walls 124 and 127. When the cover members 107 and 117 are folded as above, the color EL display 118 is folded, as shown in FIG. 9C, to cover the upper and lower surfaces of the keyboard 1 in the folded state where the first and second keyboard units 3 and 4 are laid one on top of the other. In this folding operation, the display 118 is folded while the edges thereof are slid in the circumferential grooves of the cover members 107 and 117 in association with the folding motions thereof so that a part of the display 118 is curved along the curved inner surface of semicylindrical body 130 of the joint 129.

As above, the flexible display 102 is rotatably connected to the one edge of the control unit 101 united with the first keyboard unit 3. The display 102 also has the portrait display part 115 having a width almost equal to the length L3 of the folded keyboard 1 in the long side direction of each keyboard unit 3 and 4 and also can be folded to the length almost equal to the width W1 including the width of the first keyboard unit 3 in the short side direction and the control unit 101. The display part 115 of the flexible display 102 is vertically widened in display area during use of the keyboard 1, thereby becoming easy to see and having no restriction in displaying the letters or others. For carrying in which the keyboard 1 is not used, the flexible display 102 is held in a folded state with the length almost equal to the width W1, so that the folded flexible display 102 is substantially equal in size to the total size of the keyboard unit 3 (4) and the control unit 101. Thus, it is possible to prevent the occurrence of difference in size between the keyboard 1 and the flexible display 102 in the folded state, achieving a compact and unitized device.

The curvature of the curved portion of the display 118 can be increased, so that the display 118 can be prevented from being formed with a fold line in the curved portion. Thus, the flatness of the display 118 can be maintained over a long time.

Figure 21:
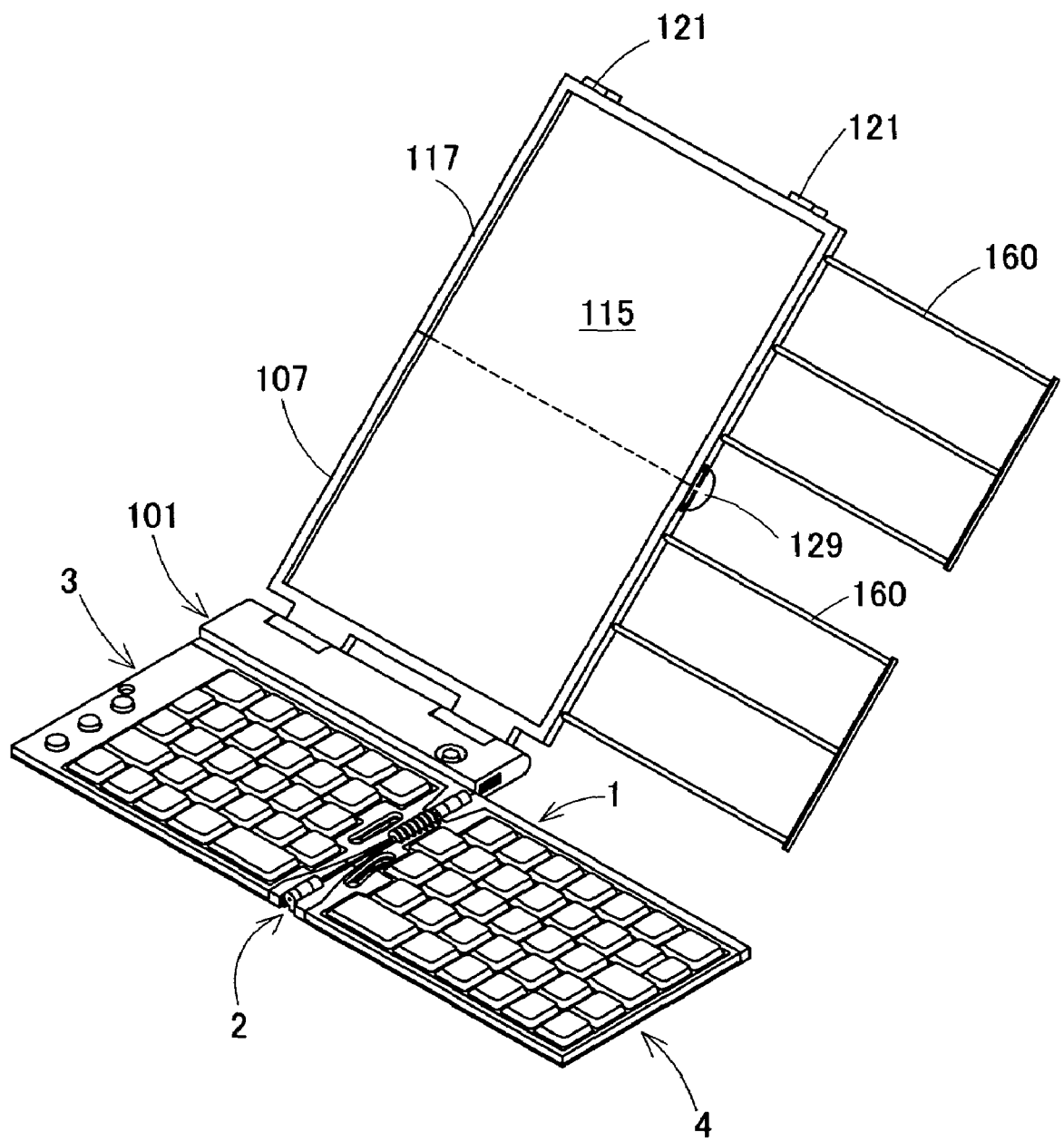
FIG. 21 is another perspective view of the input device in which document support members are provided to the flexible display.

The input device 100 in the second embodiment is provided with the portrait flexible display 102 with the width almost equal to the length L3 of the folded keyboard 1 (corresponding to the length of the first keyboard 3). In the keyboard 1 unfolded to the horizontal state, a free space is generated at the side of the flexible display 102 above the second keyboard unit 4. This free space may be utilized by document support members 160 which are detachably attached to the right side of the display 102 for supporting thereon some documents, as shown in FIG. 21. With this support members 160, documents can be supported near the portrait flexible display 102 and the operationality of inputting letters or the like with the keyboard 1 can be very enhanced.

The present invention may be embodied in other specific forms without departing from the spirit or essential characteristics thereof.

In the above first and second embodiments, the color organic EL display 118 is used as a display constituting the flexible display 102. The display may be any one of different kinds; for example, a flexible liquid crystal display, a paper like display of an In-Plane type electrophoretic display system, and a so-called electronic paper integrally constructed of an electric circuit and a display medium.

The flexible display 102 may be attached rotatably, directly to one side of the first keyboard unit 3 or the second keyboard unit 4, not through the control unit 101.

Figure 22:
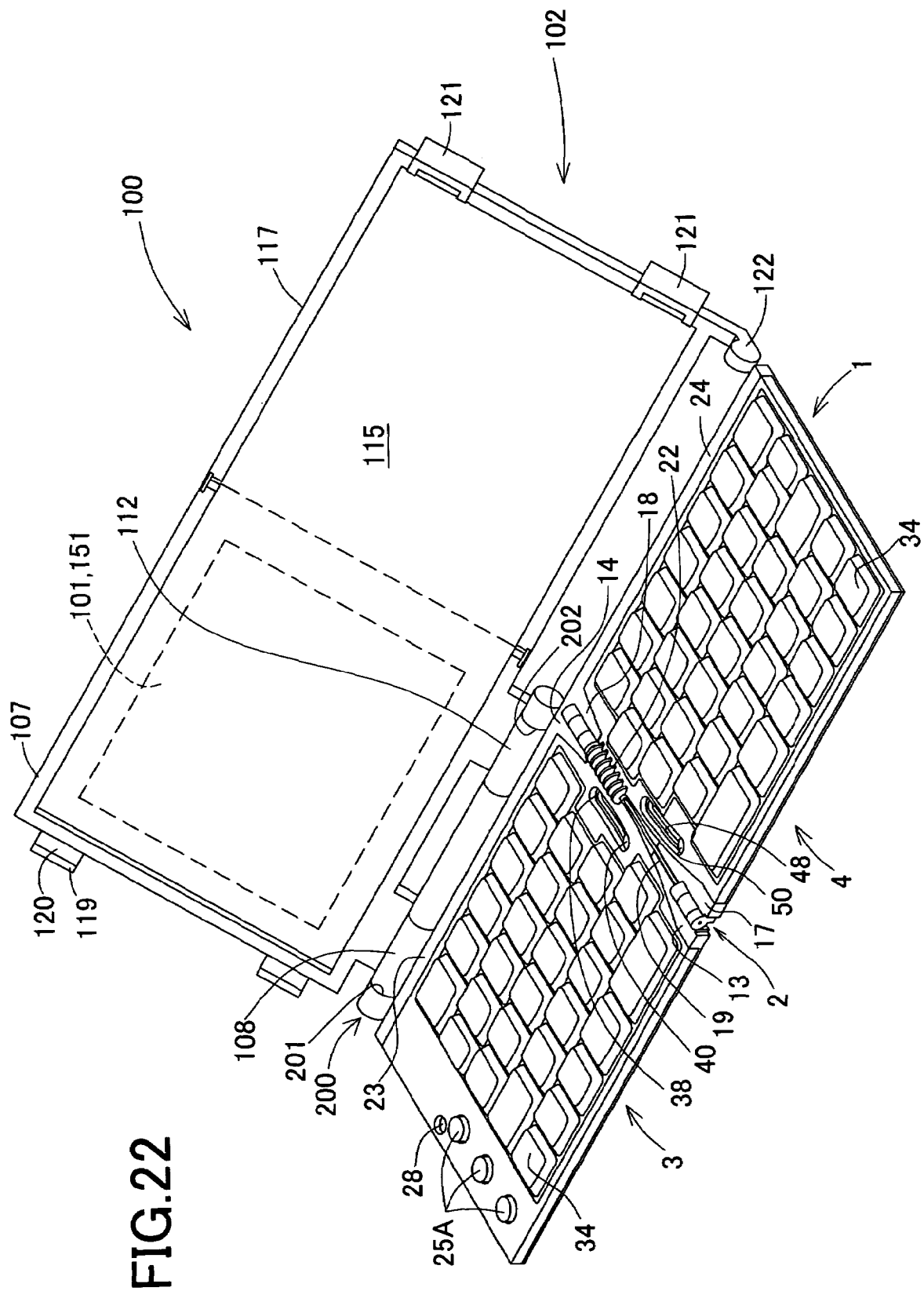
FIG. 22 is a perspective view of an input device in another example.
Figure 23:
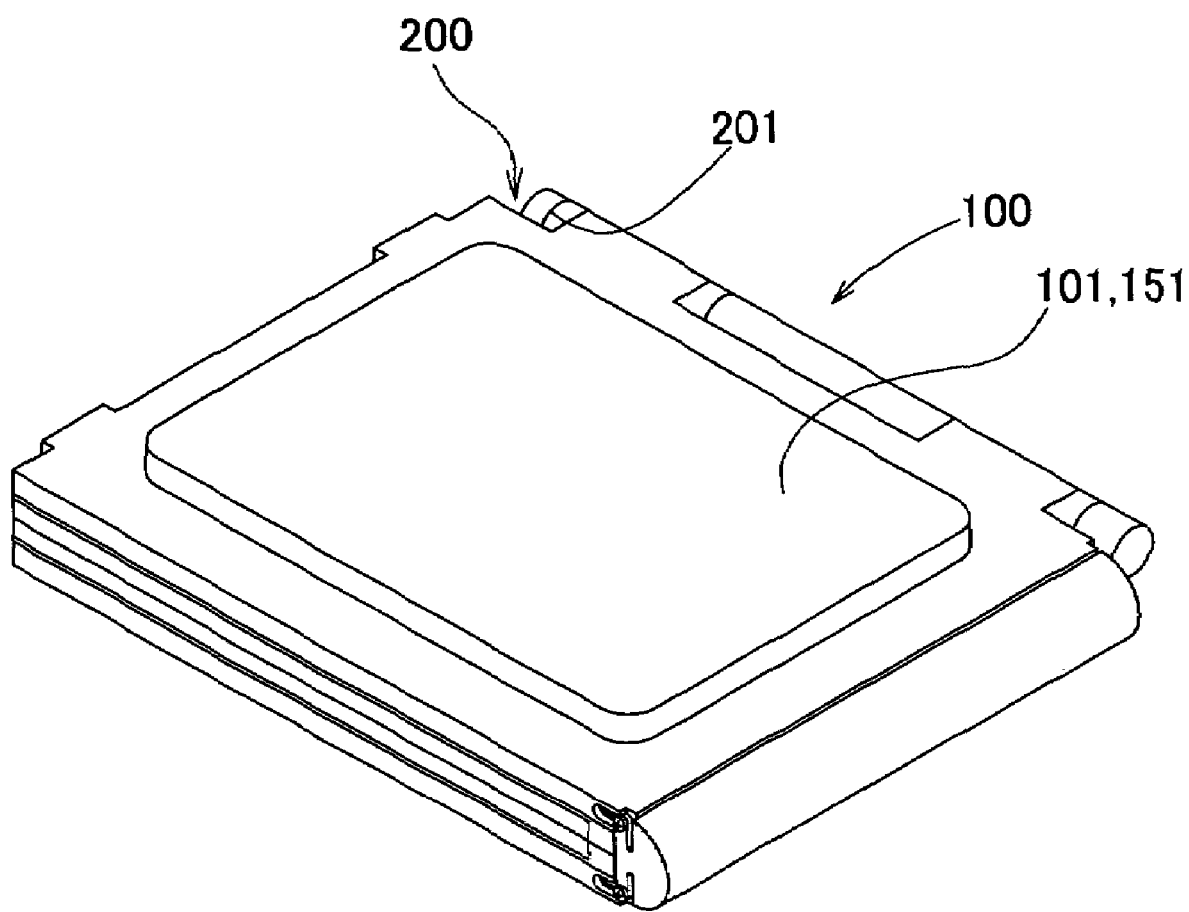
FIG. 23 is a perspective view of the input device shown in FIG. 22 wherein both keyboard units are in a folded state.

For example, as shown in FIG. 22, the input device 100 may be constructed as follows. Specifically, a support part 200 is formed at one side of the first keyboard unit 3, and the support parts 108 and 112 of the cover member 107 are rotatably supported in support recesses 201 and 202 formed in the support part 200, respectively. In this case, the control unit 101 or the computer main unit 151 may be fixed on the rear side of the cover member 107.

Figure 24:
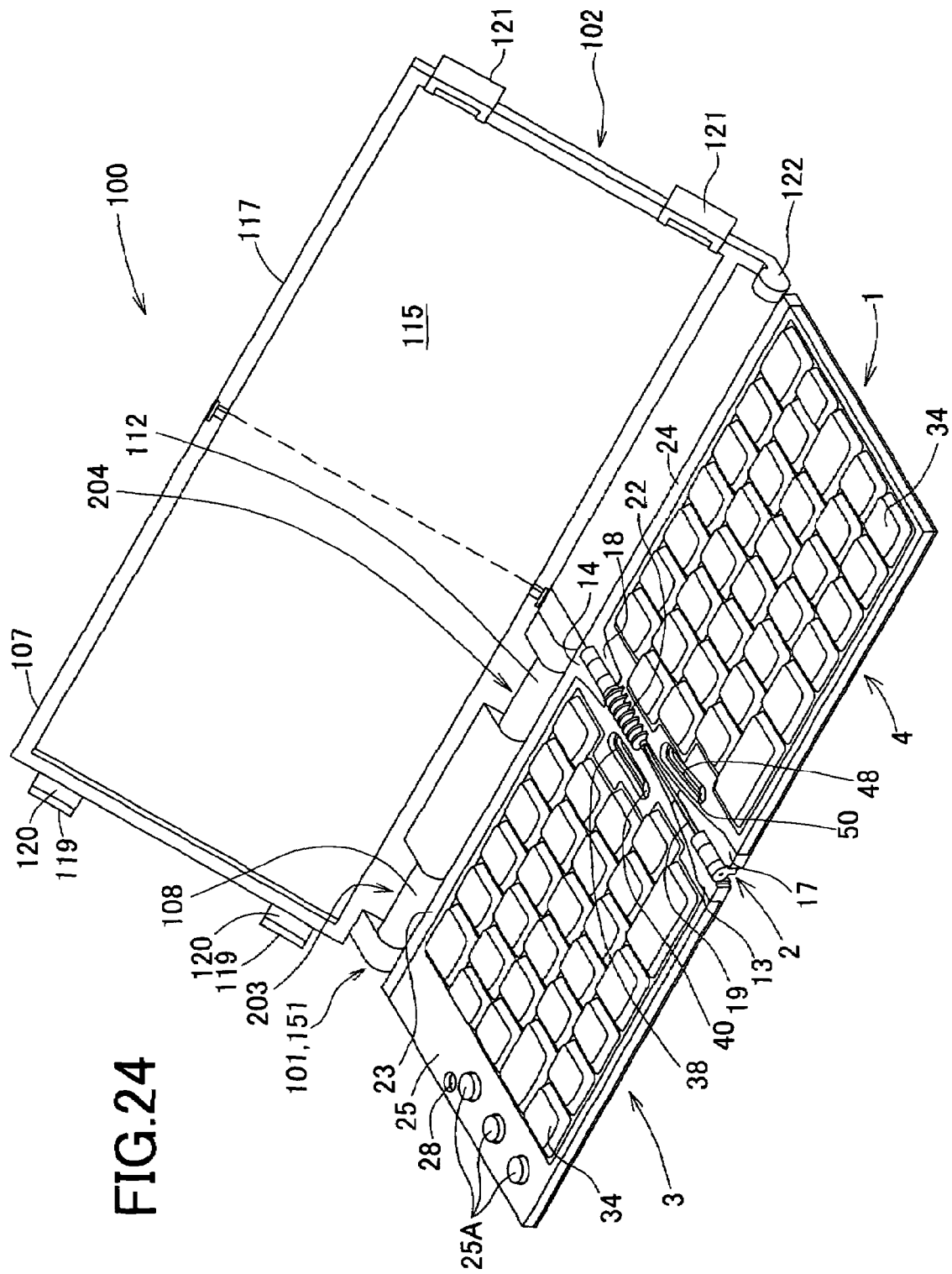
FIG. 24 is a perspective view of an input device in another example.
Figure 25:
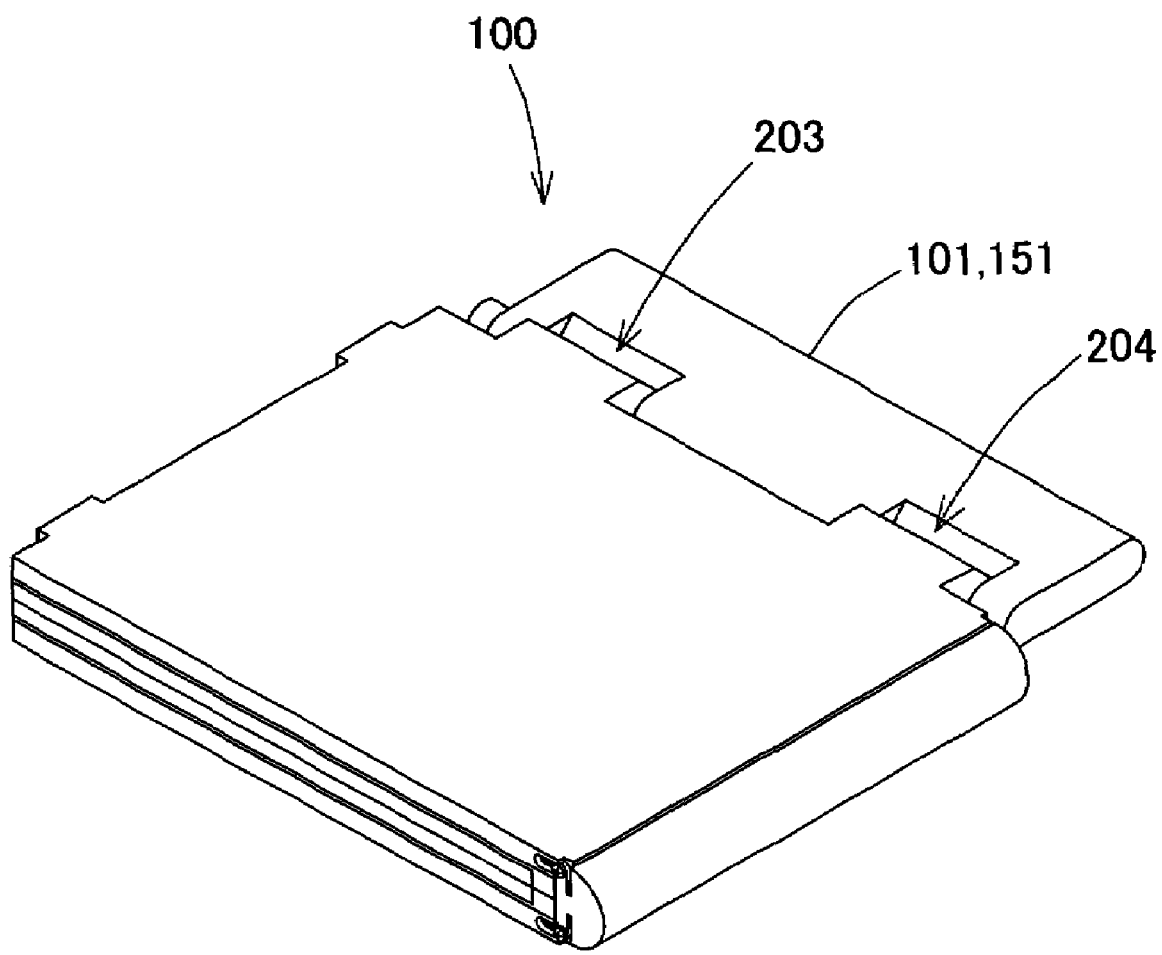
FIG. 25 is a perspective view of the input device shown in FIG. 24 wherein both keyboard units are in a folded state.

Further, as shown in FIG. 24, the input device 100 may be constructed as follows. Specifically, support recesses 203 and 204 are formed at an inner side (the side corresponding to the first keyboard unit 3) of the control unit 101 or the computer main unit 151, and the support parts 108 and 112 of the cover member 107 are rotatably supported in the support recesses 203 and 204, respectively. In this case, as shown in FIG. 25, the control unit 101 or the computer main unit 151 is exposed at the outside of the first and second keyboard units 3, 4 in a folded state.

Furthermore, in the above first and second embodiments, the keyboard 1 is constructed of the two keyboard units 3 and 4 which are foldable into two. Alternatively, the keyboard 1 may be constructed of more than two keyboard units to be foldable into three or four and the control unit 101 attached with the flexible display 102 may be connected with one edge of any one of the keyboard units. In this case, the flexible display 102 is folded to cover from outside both surfaces of the keyboard 1 folded into three or four.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An input device including:
   a foldable keyboard including a first keyboard unit, a second keyboard unit, and a rotatable connecting part provided between the first and second keyboard units, so that the first and second keyboard units are rotated relative to a first axis to come apart from each other into an unfolded, horizontally arranged state through the connecting part for use of the keyboard, while the first and second keyboard units are rotated relative to the first axis to come close to each other into a closed, folded state through the connecting part for nonuse of the keyboard, and
   a foldable flexible display rotatably attached to one edge of the first or second keyboard unit in order to rotate relative to a second axis, the display being openable relative to a support point when the first and second keyboard units are in the horizontally arranged state and foldable relative to the support point when the first and second keyboard units are in the folded state, wherein the second axis and the support point are not at a same location, and wherein the flexible display includes:
a first cover member rotatably attached to one edge of the first or second keyboard unit;
a second cover member provided side by side with the first cover member along a long side of the opened keyboard in which the first and second keyboard units are horizontally arranged;
a joint provided between the first and second cover members; and
a linkage system integrally formed with the joint at both ends thereof, the linkage system including a pair of link parts which couples the first and second cover members;
wherein the flexible display sheet is placed over the first cover member, the joint, and the second cover member,
the second cover member being slidable and foldable through the linkage system with respect to the first cover member.

2. The input device according to claim 1, wherein the flexible display is attached to one edge of the first or second keyboard unit so that the display is arranged along a direction perpendicular to an axis of the rotatable connecting part.

3. The input device according to claim 1, further including:
a pair of first wall portions provided in peripheral opposite edges of the first cover member;
a first groove formed in an inner surface of each first wall portion;
a pair of second wall portions provided in peripheral opposite edges of the second cover member;
a second groove formed in an inner surface of each second wall portion;
wherein both side edges of the flexible display sheet are slidably held in one of the first and second grooves.

4. The input device according to claim 1, wherein the flexible display sheet is folded to cover from outside both surfaces of the keyboard in which the first and second keyboard units are superposed when the second cover member is folded on the first cover member.

5. The input device according to claim 4, wherein the joint includes a semicylindrical body having a semicylindrical curved surface, and
the flexible display sheet is folded as partially curved along the semicylindrical curved surface when the second cover member is folded on the first cover member.

6. The input device according to claim 1, wherein the flexible display sheet is an organic electroluminescence (EL) display sheet.

7. A personal computer including:
a foldable keyboard including a first keyboard unit, a second keyboard unit, and a rotatable connecting part provided between the first and second keyboard units, so that the first and second keyboard units are rotated relative to a first axis to come apart from each other into an unfolded, horizontally arranged state through the connecting part for use of the keyboard, while the first and second keyboard units are rotated relative to the first axis to come close to each other into a closed, folded state through the connecting part for nonuse of the keyboard, and
a computer main unit provided to the first or second keyboard unit; and
a foldable flexible display rotatably attached to one edge of the first or second keyboard unit in order to rotate relative to a second axis, the display being openable relative to a support point when the first and second keyboard units are in the horizontally arranged state and foldable relative to the support point when the first and second keyboard units are in the folded state, wherein the second axis and the support point are not at a same location, and wherein the flexible display includes:
a first cover member rotatably attached to one edge of the first or second keyboard unit;
a second cover member provided side by side with the first cover member along a long side of the opened keyboard in the horizontally arranged state of the first and second keyboard units;
a joint provided between the first and second cover members; and
a linkage system integrally formed with the joint at both ends thereof, the linkage system including a pair of link parts which couples the first and second cover members;
wherein the flexible display sheet is placed over the first cover member, the joint, and the second cover member,
the second cover member being slidable and foldable through the linkage system with respect to the first cover member.

8. The input device according to claim 1, wherein a resilient metallic thin plate is laminated to a rear surface of the flexible display.

9. The input device according to claim 8, wherein
the flexible display includes:
a first cover member rotatably attached to one edge of the first or second keyboard unit and a second cover member slidably and foldably connected with the first cover member; and
a flexible display sheet placed over the first cover member and the second cover member, and
the resilient metallic thin plate is laminated to the flexible display sheet on a surface facing the first and second cover members.

10. The personal computer according to claim 7, wherein
a resilient metallic thin plate is laminated to a rear surface of the flexible display.

11. The input device according to claim 1, wherein
the flexible display includes: a cover unit having a length longer than the first or second keyboard unit; and a flexible display sheet set in the cover unit; and
the cover unit includes: a support portion formed at a lower end for rotatably supporting the cover unit in a cantilever state at one edge of the first or second keyboard unit; and a projection member formed at another lower end opposite to the end formed with the support portion so that a bottom surface of the projection member is flush with a bottom surface of the opened keyboard.

12. The input device according to claim 11, wherein the support portion of the cover unit is connected with the one edge of the first or second keyboard unit along a direction perpendicular to an axis of the connecting part.

13. The input device according to claim 11, wherein
the cover unit includes:
a first cover member provided with a support portion and rotatably attached to the one edge of the first or second keyboard unit through the support portion;
a second cover member provided side by side with the first cover member along a long side of the opened keyboard in the horizontally arranged state of the first and second keyboard units; and
a joint provided between the first and second cover members to connect the first and second cover members in a slidable and foldable relation; and
the projection member is formed at a lower part of the second cover member.

14. The input device according to claim 13, wherein the flexible display sheet is folded to cover from outside both surfaces of the keyboard which the first and second keyboard units are superposed when the second cover member is folded on the first cover member.

15. The input device according to claim 13, wherein the joint includes a semicylindrical body having a semicylindrical curved surface, and
the flexible display sheet is folded as partially curved along the semicylindrical curved surface when the second cover member is folded on the first cover member.

16. The input device according to claim 1, wherein the flexible display is widened from the folded state to a state extending in a direction parallel to a long side of the keyboard in which the first and second keyboard units are horizontally arranged.

17. The input device according to claim 16, wherein the keyboard has a first length in the horizontally arranged state of the first and second keyboard units, and
the flexible display includes a display part having a length substantially equal to the first length, and the flexible display is folded, due to the flexibility, to another length substantially equal to a second length of the folded keyboard in which the first and second keyboard units are superposed one on top of the other through the connecting part.

18. The input device according to claim 16 further including
a control unit united with the first or second keyboard unit and used for controlling the keyboard and the flexible display,
wherein the flexible display is rotatably attached to one edge of the control unit and has a width corresponding to a total width of the first or second keyboard unit and the control unit.

19. The personal computer according to claim 7, wherein the flexible display is widened from the folded state to a state extending in a direction parallel to a long side of the keyboard in which the first and second keyboard units are horizontally arranged.

20. The personal computer according to claim 19, wherein the keyboard has a first length in the horizontally arranged state of the first and second keyboard units, and
the flexible display includes a display part having a length substantially equal to the first length and is folded, due to the flexibility, to another length substantially equal to a second length of the keyboard in which the first and second keyboard units are superposed one on top of the other through the connecting part.

21. The personal computer according to claim 19, wherein the flexible display is folded to cover from outside both surfaces of the keyboard in which the first and second keyboard units are superposed one on top of the other.

22. The personal computer according to claim 19, wherein the flexible display has a width corresponding to a total width of the first or second keyboard unit and the control unit.

23. The input device according to claim 1, wherein the keyboard has a first length in the horizontally arranged state of the first and second keyboard units, and
the flexible display includes a display part having a length substantially equal to the first length and is folded, due to the flexibility, to another length substantially equal to a second length of the keyboard in which the first and second keyboard units are superposed one on top of the other through the connecting part.

24. The input device according to claim 1, wherein the first and second keyboard units each are of a rectangular shape having long sides and short sides, and
the flexible display is folded along the long sides.

25. The input device according to claim 24, wherein the keyboard in which the first and second keyboard units are horizontally arranged has an open length in parallel to the long side of the keyboard unit, and
the flexible display includes a landscape display part having a length substantially equal to the open length of the keyboard, and the flexible display is folded, due to the flexibility, to another length substantially equal to a length of the long side of the folded keyboard in which the first and second keyboard units are superposed through the connecting part.

26. The input device according to claim 24 further including
a control unit united with the first or second keyboard unit and used for controlling the keyboard and the flexible display,
wherein the flexible display is rotatably attached to one edge of the control unit and has a width corresponding to a total width of the first or second keyboard unit and the control unit in a direction of the short side.

27. The input device according to claim 1, the first and second keyboard units each are of a rectangular shape having long sides and short sides, and
the flexible display is folded along the short sides.

28. The input device according to claim 27 further including
a control unit united with the first or second keyboard unit and used for controlling the keyboard and the flexible display,
wherein the flexible display is rotatably attached to one edge of the control unit and includes a portrait display part having a width substantially equal to the length of the long side of the folded keyboard in which the first and second keyboard units are superposed, so that the flexible display is folded to another width substantially equal to a total width of the first or second keyboard unit and the control unit in a direction of the short side.

29. The input device according to claim 1, wherein the flexible display is folded to cover from outside both surfaces of the keyboard in which the first and second keyboard units are superposed.

* * * * *